United States Patent
Wu et al.

(10) Patent No.: US 8,817,709 B2
(45) Date of Patent: Aug. 26, 2014

(54) METHODS AND APPARATUS FOR CONTROLLING CHANNEL UTILIZATION

(75) Inventors: Xinzhou Wu, Monmouth Junction, NJ (US); Junyi Li, Chester, NJ (US); Pramod Viswanath, Champaign, IL (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 12/578,726

(22) Filed: Oct. 14, 2009

(65) Prior Publication Data

US 2011/0085455 A1 Apr. 14, 2011

(51) Int. Cl.
*H04W 4/00* (2009.01)
*H04W 72/08* (2009.01)

(52) U.S. Cl.
CPC .................................. *H04W 72/082* (2013.01)
USPC ......... 370/329; 370/235; 455/452.2; 455/509

(58) Field of Classification Search
CPC ......... H04L 47/10; H04L 47/11; H04L 47/12; H04L 47/14; H04L 47/263; H04L 12/5695; H04L 47/125; H04L 47/822; H04L 67/104; H04L 47/22; H04W 84/18; H04W 28/08; H04W 28/18; H04W 72/0406; H04W 28/10; H04W 40/246; H04W 76/02; H04W 16/14; H04W 72/12
USPC .................. 370/235, 329, 331, 509; 455/513, 455/452.2, 39, 63.1, 453
See application file for complete search history.

(56) References Cited

U.S. PATENT DOCUMENTS

| | | | |
|---|---|---|---|
| 6,597,668 B1 | 7/2003 | Schafer et al. | |
| 7,397,785 B2 | 7/2008 | Wu et al. | |
| 7,747,256 B2 * | 6/2010 | Hanov et al. | 455/452.2 |
| 2002/0142789 A1 | 10/2002 | Kuhl et al. | |
| 2007/0105576 A1* | 5/2007 | Gupta et al. | 455/509 |
| 2007/0211678 A1* | 9/2007 | Li et al. | 370/338 |
| 2008/0006286 A1 | 1/2008 | Mua et al. | |

(Continued)

FOREIGN PATENT DOCUMENTS

| | | |
|---|---|---|
| TW | 200939851 A | 9/2009 |
| WO | 2007082249 A1 | 7/2007 |

(Continued)

OTHER PUBLICATIONS

International Search Report and Written Opinion—PCT/US2010/052378, International Search Authority—European Patent Office—Mar. 1, 2011.

(Continued)

*Primary Examiner* — Awet Haile
(74) *Attorney, Agent, or Firm* — Joseph B. Agusta

(57) ABSTRACT

Methods and apparatus for determining a portion of a channel, e.g., a peer discovery channel, to use in a communications network, e.g., an ad hoc peer to peer network, are described. In the communication network, the channel includes a recurring set of time/frequency resources. A device monitors the congestion level and decides to use a whole channel or a fraction of a channel (e.g., ½, ¼) as a function of the congestion level. The device may change the fraction of the channel it occupies as the congestion level changes. The device broadcasts control information indicating the fraction of the channel it occupies. The device may be a mobile wireless terminal.

17 Claims, 16 Drawing Sheets

(56) References Cited

U.S. PATENT DOCUMENTS

| | | |
|---|---|---|
| 2008/0062867 A1 | 3/2008 | Lee et al. |
| 2008/0112334 A1 | 5/2008 | Laroia et al. |
| 2008/0205370 A1 | 8/2008 | Bae et al. |
| 2008/0207215 A1* | 8/2008 | Chu et al. .................. 455/452.2 |
| 2008/0298502 A1 | 12/2008 | Xu et al. |
| 2009/0005057 A1 | 1/2009 | Lee et al. |
| 2009/0010232 A1 | 1/2009 | Laroia et al. |
| 2009/0111497 A1* | 4/2009 | Bitter et al. .................. 455/513 |
| 2009/0147680 A1* | 6/2009 | Liu ............................... 370/232 |
| 2009/0161546 A1* | 6/2009 | Key et al. ...................... 370/236 |
| 2011/0205899 A1* | 8/2011 | Hosein ......................... 370/235 |

FOREIGN PATENT DOCUMENTS

| | | |
|---|---|---|
| WO | 2008144363 A2 | 11/2008 |
| WO | 2009009314 A1 | 1/2009 |
| WO | 2009069068 A2 | 6/2009 |

OTHER PUBLICATIONS

Taiwan Search Report—TW099135122—TIPO—Mar. 28, 2013.

* cited by examiner

METHODS AND APPARATUS FOR CONTROLLING CHANNEL UTILIZATION

FIELD

Various embodiments relate to wireless communications, and more particularly, to methods and apparatus for controlling communications in a peer to peer network in which device density varies.

BACKGROUND

In peer to peer wireless communications systems in which wireless terminals directly communicate with one another it may be expected that there will be different numbers of wireless communications devices in a local vicinity at different times. It would be beneficial if a peer to peer wireless device could communicate small amounts of information, e.g., discovery information, relatively frequently to other devices which may happen to be in its vicinity. Thus devices in a local vicinity could maintain situational awareness. There is a limited amount of air link resources available to be used for discovery purposes. Resources allocated to discovery take away from the amount of resources that can be allocated for other purposes, e.g. peer to peer traffic signaling.

A rigid peer discovery implementation which is designed to accommodate a large number of users is good for times of high congestion but can be inefficient during times of low congestion where many potential slots may go unused. Alternatively, a rigid peer discovery implementation which is designed to accommodate a small number of users can be good during periods of low congestion, but may be overwhelmed during high congestion times, with users being unable to obtain a slot.

Based on the above discussion, it should be appreciated there is a need for methods and apparatus facilitating flexible use of peer discovery resources.

SUMMARY

Methods and apparatus for determining a portion of a channel, e.g., a peer discovery channel, to use in a communications network are described. Various described methods and apparatus are well suited for use in an ad hoc peer to peer network, e.g., a network in which wireless terminals directly communicate with one another without the involvement of a central network controller. In the communication network, the channel includes a recurring set of time/frequency resources. A device monitors the congestion level and decides to use a whole channel or a fraction of a channel (e.g., ½. ¼) as a function of the congestion level. The device may change the amount of the channel it occupies as the congestion level changes. The device broadcasts control information indicating the portions of the channel it occupies.

In one exemplary embodiment, there is a plurality of peer discovery channels in the recurring timing structure. A wireless communications device monitors at least a portion of the peer discovery channels and determines a level of congestion. Based on its determined level of congestion, the wireless communications device determines whether to use a full peer discovery channel for its intended peer discovery transmissions or a fraction of a peer discovery channel for its intended peer discovery transmissions. The device broadcasts control information indicating which peer discovery channel portions it is using for transmission. In some embodiments, the control information is encoded via pilot signals, e.g., different pilot symbol sequences communicate different levels of channel usage and/or communicate which particular portions of a channel are being used by the device. The wireless communications device may change its amount of peer discovery channel usage in response to a detected change in the level of congestion. Dynamic adjustment of peer discovery resource usage in response to congestion variation can facilitate efficient use of the limited peer discovery air link resources In some embodiments, wireless communications devices are wireless terminals. The wireless terminals may be, e.g., mobile devices, e.g., handheld devices such as phone devices, personal data assistants (PDAs), etc.

An exemplary method of operating a communications device, in accordance with some embodiments, comprises: monitoring a recurring set of time and frequency resource units to determine a level of congestion; and determining a portion of a communications channel to be used by said communications device for transmission purposes based on the determined level of congestion. An exemplary communications device, in accordance with some embodiments, comprises: at least one processor configured to: monitor a recurring set of time and frequency resource units to determine a level of congestion; and determine a portion of a communications channel to be used by said communications device for transmission purposes based on the determined level of congestion. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
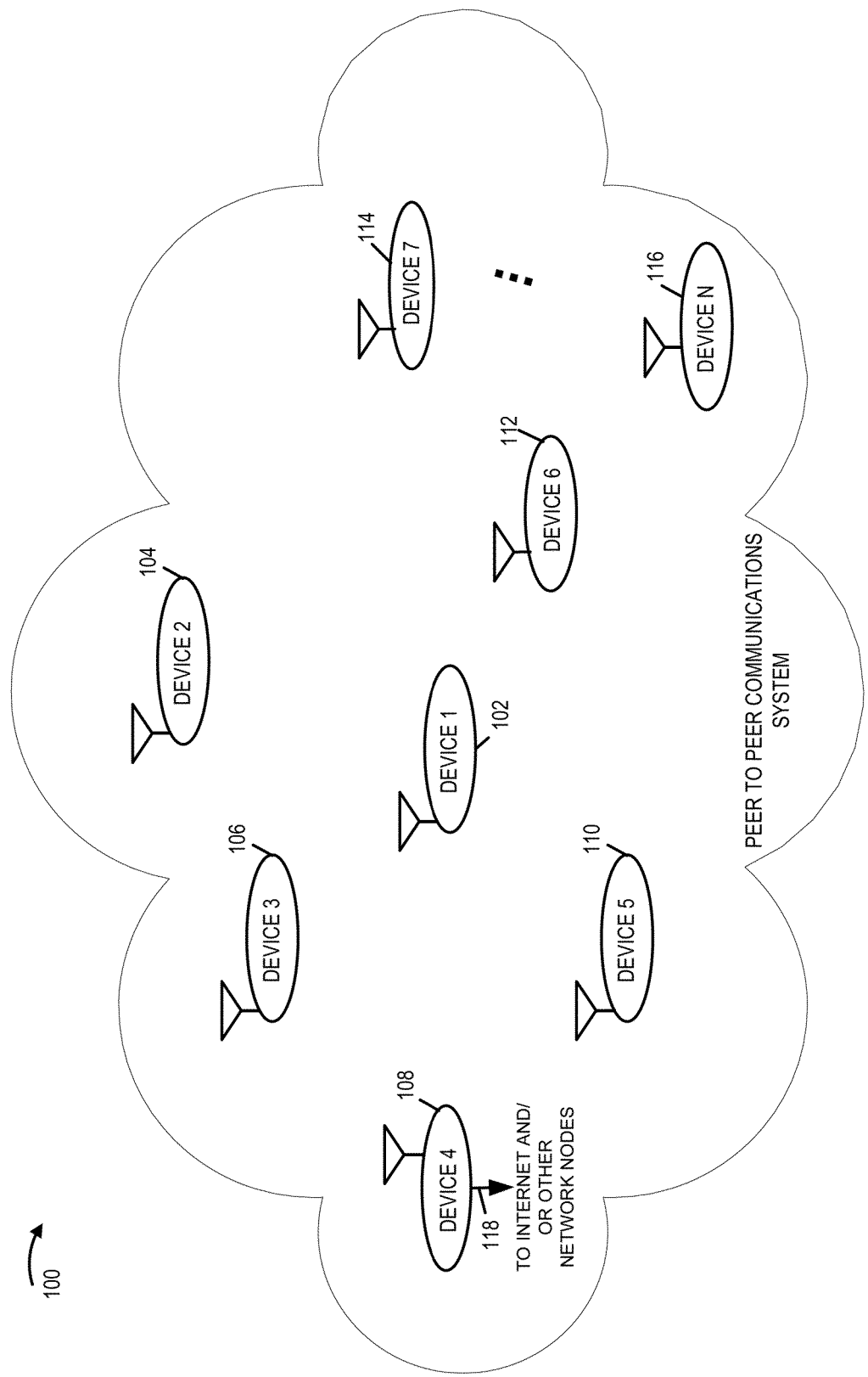
FIG. 1 is a drawing of an exemplary peer to peer communications system in accordance with an exemplary embodiment.

FIG. 1 is a drawing of an exemplary peer to peer communications system 100 in accordance with an exemplary embodiment. Exemplary peer to peer communications system 100 includes a plurality of wireless communications devices (device 1 102, device 2 104, device 3 106, device 4 108, device 5 110, device 6 112, device 7 114, . . . , device N 116. Some of the wireless communications devices, e.g., device 1 102, device 2 104, device 3 106, device 5 110, device 6 112, device 7 114, and device N 116, are mobile wireless communications devices, e.g., handheld wireless terminals supporting peer to peer communications. Some of the wireless communications devices, e.g., device 4 108, include an interface 118, e.g., a wired or fiber optic interface, coupling the device to the Internet and/or other network nodes via a backhaul network. Device 4 108 is, e.g., an access point supporting peer to peer communications. Peer to peer communications system 100 uses a recurring peer to peer timing structure including sets of peer discovery resources.

A wireless communications device in system 100 monitors a recurring set of time and frequency resource units to determine a level of congestion. The recurring set of time and frequency resource units, in some embodiments, are resource units, e.g., OFDM tone-symbols, designated to carry peer discovery signals within the recurring peer to peer timing structure. The wireless communications device determines a portion of a communications channel, e.g., a portion of a peer discovery communications channel, to use for transmission purposes based on the determined level of congestion. The wireless device transmits signals using its determined portion of the communications channel. For example, the wireless communications device transmits peer discovery signals using its determined portion of a peer discovery channel, where the peer discovery signals include data symbols and pilot symbols. In some embodiments, the transmitted signals convey control information indicating the fraction of the channel occupied by the communications device, e.g., the transmitted pilot symbols convey the control information indicating fractional channel usage information.

Figure 2:
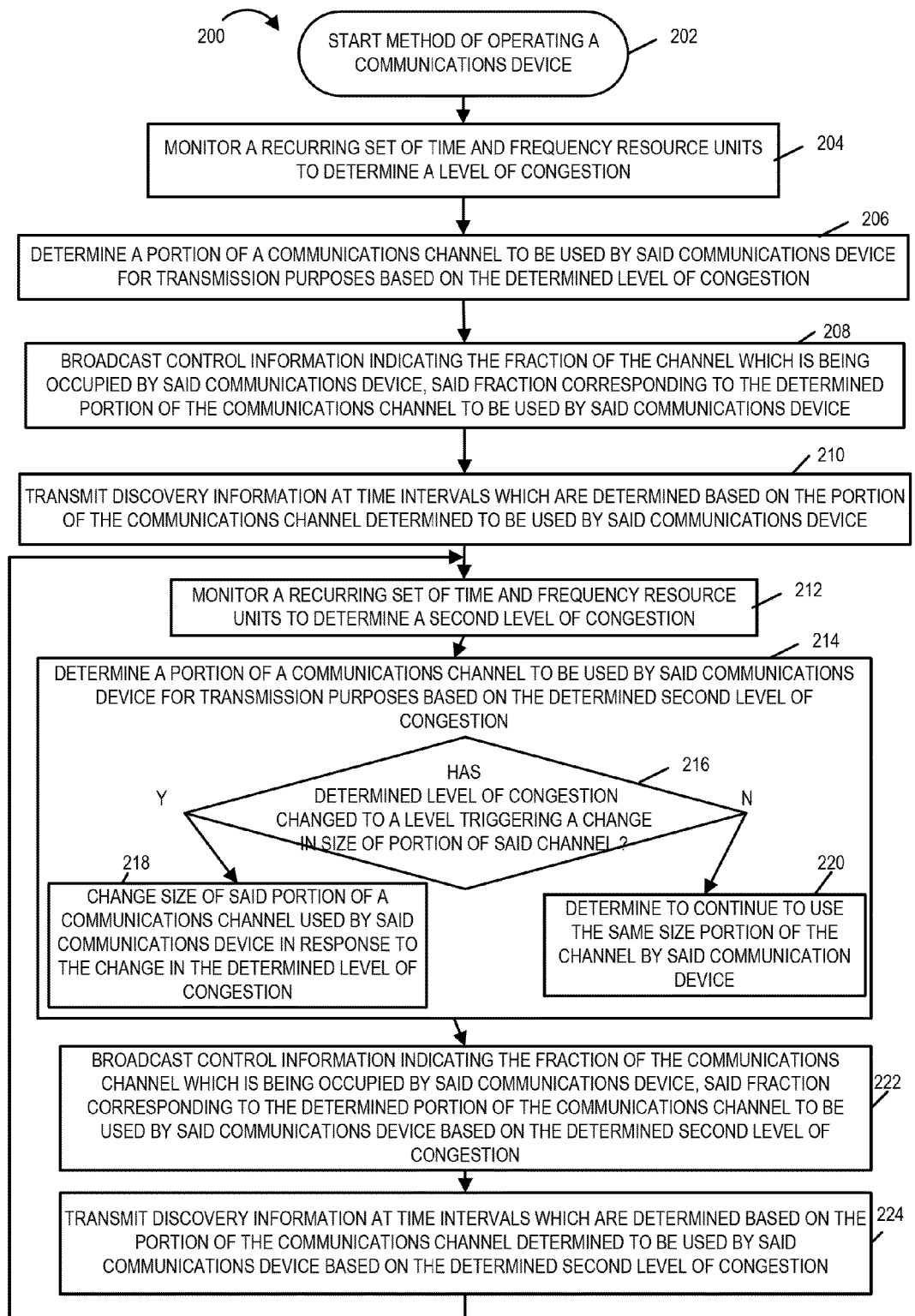
FIG. 2 is a flowchart of an exemplary method of operating a communications device in accordance with an exemplary embodiment.

FIG. 2 is a flowchart 200 of an exemplary method of operating a communications device accordance with an exemplary embodiment. The communications device is, e.g., a wireless communications device in a peer to peer communications network, e.g., an ad-hoc peer to peer communications network. Operation starts in step 202, where the communications device is powered on and initialized and proceeds to step 204. In step 204 the communications device monitors a recurring set of time and frequency resource units to determine a level of congestion. In some embodiments, the level of congestion is a function of a number of devices detected to be using a communications channel, e.g., the number of communications devices detected to be using the same peer discovery communications channel as the communications device implementing the method of flowchart 200. In some embodiments, the level of congestion is a function of a number of devices detected to be using any of a plurality of communications channels, e.g., a total number of communications devices detected to be using any of the plurality of peer discovery communications channels during a monitored time interval. In some embodiments, the level of congestion is a network level of congestion and said monitored set of recurring time and frequency resource units correspond to a plurality of peer discovery channels. In some embodiments, the level of congestion is a level of channel congestion. Operation proceeds from step 204 to step 206.

In step 206 the communications device determines a portion of a communications channel to be used by said communications device for transmission purposes based on the determined level of congestion. At times, the communications device may determine to use a full communications channel, e.g., a full peer discovery channel. At other times, the communications device may decide to use a portion of the communications channel, e.g., ½ or ¼, or ¾ or a peer discovery channel. Accordingly, a device may decide to use a portion of a channel which corresponds to the full channel or a portion which is less than the full channel. In some embodiments, the communications channel is a channel used to communicate peer discovery information, e.g., a peer to peer discovery channel. In some embodiments, the portion of said communications channel is a fraction of the communications channel. In some embodiments, the portion of the communications channel determined to be used by said communications device is a function of a number of devices detected to be using said communications channel. In various embodiments, the monitored recurring set of time and frequency resource units correspond to a plurality of different communications channels, and said communications channel which corresponds to said portion used by said communications device is one of a plurality of different communications channels.

In some embodiments, the step of monitoring a recurring set of time and frequency resource units (step 204) includes monitoring a communications channel on a recurring basis and decoding broadcast control information from a second wireless communications device. In some such embodiments, the step of determining a portion of a communications channel to be used (step 204) may, and sometimes does, include determining said portion of said communications channel to be used based on said broadcast control information from said second communications device. For example, the communications device may have selected a particular peer discovery communications channel to use for its peer discovery signaling and may monitor detected activity on that particular peer discovery channel from other devices also using the same peer discovery channel. Then the communications device may use the detected information to determine the amount of peer discovery resources and which particular peer discovery resources of the peer discovery channel that it should use for transmitting its peer discovery signaling, e.g., identifying and selecting unused available resources.

Operation proceds from step 206 to step 208. In step 208 the communications device broadcasts control information indicating the fraction of the channel which is being occupied by said communications device, said fraction corresponding to the determined portion of the communications device to be used by said communications device. In some embodiments, the broadcast control information indicates one of a plurality of recurring channel portions in a recurring timing structure that said communications device is using. For example, in one exemplary embodiment, a communications channel is divided into first, second, third and fourth recurring portions, and the broadcast control information indicates which one of the first second, third or fourth portions the communications device is using on a recurring basis when the communications device is using ¼ of the communications channel. In some embodiments, the communications device may at times broadcast its peer discovery signals on each of the fractional portions of the channel, e.g., when it has determined to use the full channel. At other times the communications device may broadcast its peer discovery signals on less than all of the fractional portions of a peer discovery channel, e.g., when less than the full channel is being used by the communications device. Operation proceeds from step 208 to step 210.

In step 210 the communications device transmits discovery information at time intervals which are determined based on the portion of the communications channel determined to be used by said communications device. Operation proceeds from step 210 to step 212.

In step 212 the communications device monitors a recurring set of time and frequency resource units to determine a second level of congestion. Operation proceeds from step 212 to step 214.

In step 214 the communications device determines a portion of a communications channel to be used by said communications device for transmission purposes based on the determined second level of congestion. Step 214 includes sub-steps 216, 218 and 220. In sub-step 216 the communications device checks if the determined level of congestion has changed to a level triggering a change in the size of the portion of a communications channel to be used by said communications device. If the determination of sub-step 216 indicates the determined level of congestion has changed such as to trigger a change in the size of the portion of a communications channel to be used by the communications device, then operation proceeds from sub-step 216 to sub-step 218. In sub-step 218 the communications device changes the size of said portion of a communications channel used by said communications device in response to the change in the determined level of network congestion. In some embodiments, the change in the determined level of network congestion may be, and sometimes is, due to a change in utilization of communications resources in said monitored set of communications resources by other devices than said communications device. In some embodiments, the change in the determined level of congestion may be, and sometimes is, due, at least in part, to a change in utilization of communications resources corresponding to at least one communications channel other than the communications channel which corresponds to said portion used by said communications device.

If the determination of sub-step 216 indicates that the determined level of congestion has not changed such as to trigger a change in portion size of a communication channel to be used by said communications device, then operation proceeds from sub-step 216 to sub-step 220. In sub-step 220 the communication device determines to continue the use the same size portion of the communications channel by said communications device. Operation proceeds from step 214 to step 222.

In step 222 the communications device broadcasts control information indicating the fraction of the communications channel which is being occupied by said communications device, said fraction corresponding to the determined portion of the communications channel to be used by said communications device based on the determined second level of congestion. Steps 212, 214 and 222, in some embodiments, may be viewed as repeating said monitoring, determining and broadcasting steps (204, 206, 208) and changing the size of said portion of the communications channel used by said communications device in response to a change in the determined level of congestion, e.g., a change to a level of congestion to initiate a trigger in the size of channel portion to be used by the communications device.

Operation proceeds from step 222 to step 224. In step 224 the communications device transmits discovery information at time intervals which are determined based on the portion of the communications channel determined to be used by said communications based on the determined second level of congestion. Operation proceeds from step 224 to step 212 for additional monitoring to make another determination of congestion.

Figure 3:
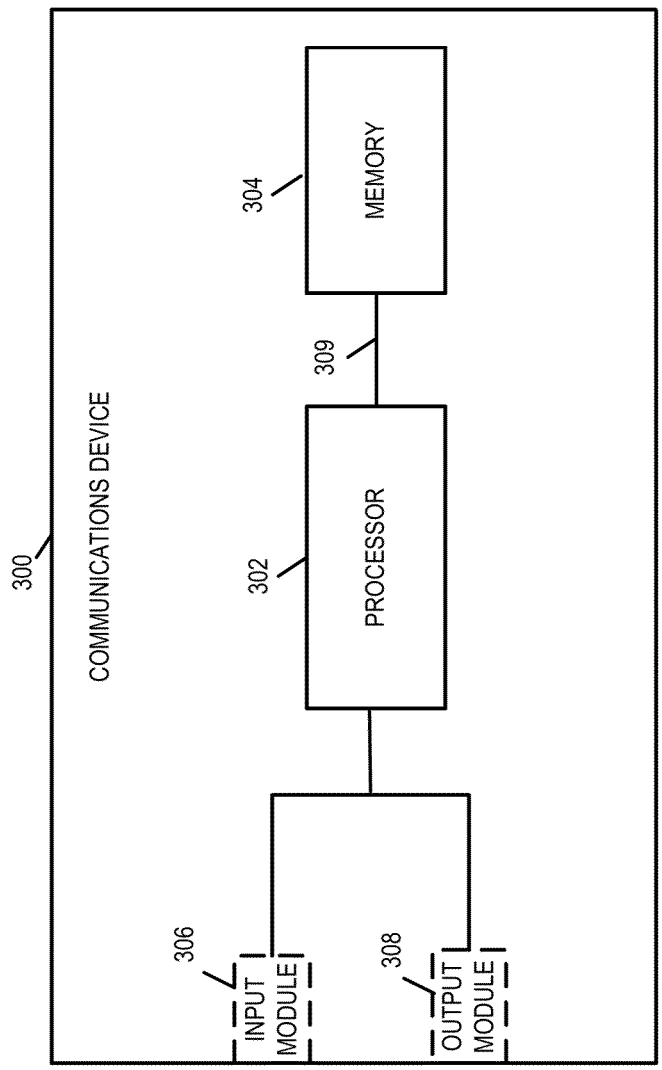
FIG. 3 is a drawing of an exemplary communications device, in accordance with an exemplary embodiment.

FIG. 3 is a drawing of an exemplary communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: monitor a recurring set of time and frequency resource units to determine a level of congestion; and determine a portion of a communications channel to be used by said communications device for transmission purposes based on the determined level of congestion. In some embodiments, said portion of the communications channel is a fraction of the communications channel, and processor 302 is further configured to broadcast control information indicating the fraction of the channel which is being occupied by said communications device, said fraction corresponding to the determined portion of the communications channel to be used by said communications device.

In some embodiments, said broadcast control information indicates which one of a plurality of recurring channel portions in a recurring channel timing structure said communications device is using. For example, if the communications channel is divided into first, second, third and fourth recurring portions, in some embodiments, the broadcast control information indicates which one of the first, second, third or fourth portions the communications device is using on a recurring basis, when the communications device uses ¼ of the channel.

In some embodiments, said communications channel is a channel used to communicate discovery information, e.g., peer to peer discovery information. Some examples of peer discovery information include device identifiers, user identifiers, group identifiers, requests for service, offer of a service, request for a device or a user, request for a product, offer of a product, request for information, an offer of information, and advertisement information.

In some embodiments, processor 302 is further configured to transmit discovery information at time intervals which are determined based on the portion of the communications channel determined to be used by said communications device. In some such embodiments, said portion of the communications channel determined to be used by said communications device is a function of a number of devices detected to be using said communications channel.

In various embodiments processor 302 is further configured to repeat said monitoring, determining and broadcasting steps. In some embodiments, processor 302 is further configured to change the size of said portion of the channel used by said communications device in response to a change in the determined level of congestion.

In some embodiment, said monitored recurring set of time and frequency resource units correspond to a plurality of different communications channels, said communications channel which corresponds to said portion used by said communications device being one of said plurality of different communications channels. In some embodiments, said change in the determined level of congestion may be, and sometimes is, due to a change in utilization of communications resources in said monitored set of communications resources by other devices than said communications device. In some embodiments, said change in the determined level of congestion may be, and sometimes is, due, at least in part, to a change in utilization of communications resources corresponding to at least one channel other than said communications channel which corresponds to said portion used by said communications device.

Figure 4:
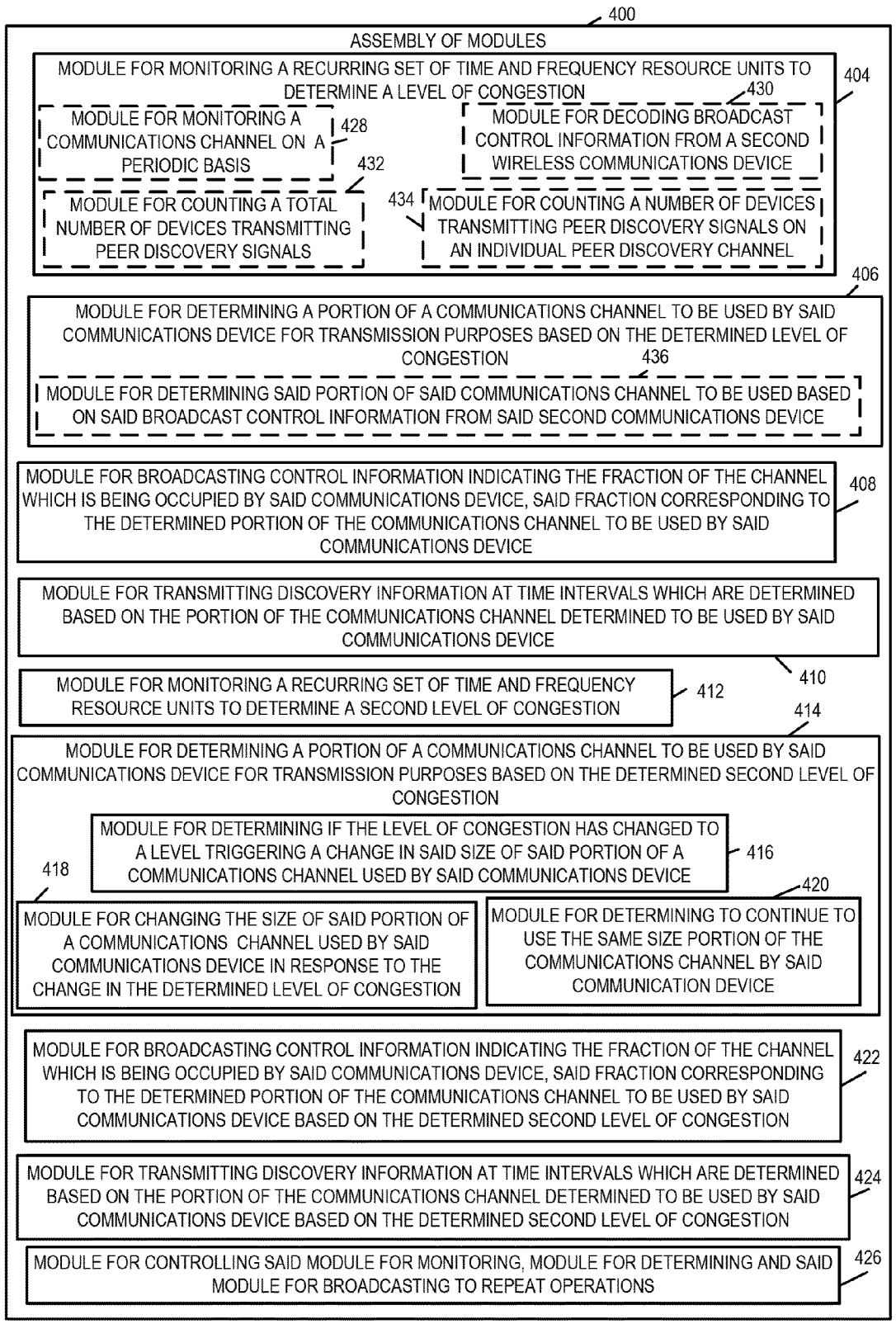
FIG. 4 is an assembly of modules which can, and in some embodiments is, used in the communications device illustrated in FIG. 3.

FIG. 4 is an assembly of modules 400 which can, and in some embodiments is, used in the communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for monitoring a recurring set of time and frequency resource units to determine a level of congestion, a module 406 for determining a portion of a communications channel to be used by said communications device for transmission purposes based on the determined level of congestion, a module 408 for broadcasting control information indicating the fraction of the channel which is being occupied by the communications device, said fraction corresponding to the determined portion of the communications channel to be used by said communications device, and a module 410 for transmitting discovery information at time intervals which are determined based on the portion of the communications channel determined to be used by said communications device. Assembly of module 400 further includes a module 412 for monitoring a recurring set of time and frequency resource units to determine a second level of congestion. Assembly of modules 400 further includes a module 414 for determining a portion of a communications channel to be used by said communications device for transmission purposes based on the determined second level of congestion, a module 422 for broadcasting control information indicating the fraction of the communications channel which is being occupied by said communications device, said fraction corresponding to the determined portion of the communications channel to be used by said communications device based on the second level of congestion, a module 424 for transmitting discovery information at time intervals which are determined based on the portion of the communications channel determined to be used by said communications device based on the second level of congestion and a module 426 for controlling said module for monitoring 404, module for determining 406 and module for broadcasting 408 to repeat operations. In some embodiments, module 426 also controls the module for monitoring 412, the module for determining 414 and the module for broadcasting 422 to repeat operations.

In some embodiments module 414 includes one or more of: a module 416 for determining if the level of congestion has changed to a level triggering a change in said size of said portion of a communications channel used by said communications device; a module 418 for changing the size of said portion of a communications channel used by said communications device in response to the change in the determined level of congestion; and a module 420 for determining to continue to use the same size portion of the channel by said communications device. In various embodiments, the determination of module 416 results in the operation of one of module 418 and module 420. In some embodiments, one or more of modules 416, 418 and 420 are sub-modules within module 414. In some embodiments, one or more of modules 416, 418 and 418 are independent modules with regard to module 414.

In some embodiments, module 404 includes one or more of: module 428 for monitoring a communications channel on a periodic basis, module 430 for decoding broadcast control information from a second communications device, module 432 for counting a total number of devices transmitting peer discovery signals, and a module 434 for counting a number of devices transmitting peer discovery signals on an individual peer discovery channel. In some embodiments, the communications device determines an overall level of network congestion with regard to peer discovery, e.g., based on a total count of detected peer discovery signals. In some embodiments, the communications device determines a channel level of congestion for the particular peer discovery channel which it is using to transmit its peer discovery signals, e.g., based on detected current activity on the particular peer discovery channel which it is using.

In some embodiments, module 406 includes a module 436 for determining said portion of said communications channel to be used based on said broadcast control information from said second communications device. In some embodiments, one or more of modules 428, 430, 432, 434, and 436 may be independent modules.

Figure 5:
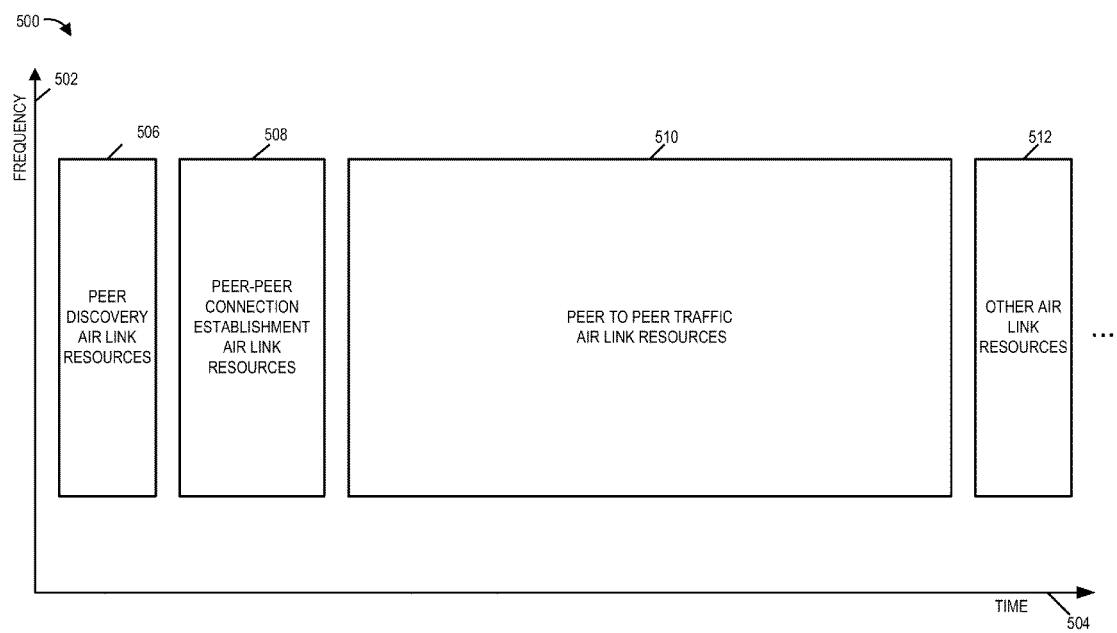
FIG. 5 is a drawing of an exemplary frequency vs time plot illustrating exemplary air link resources in an exemplary peer to peer recurring timing structure.

FIG. 5 is a drawing of an exemplary frequency vs time plot 500 illustrating exemplary air link resources in an exemplary peer to peer recurring timing structure. Frequency vs time plot 500 include a vertical axis 502 representing frequency, e.g., OFDM tones, and a horizontal axis 504 representing time, e.g., OFDM symbol transmission time intervals. Plot 500 includes peer discovery air link resource 506, peer to peer connection establishment air link resources 508, peer to peer traffic air link resources 510 and other air link resources 512.

Figure 6:
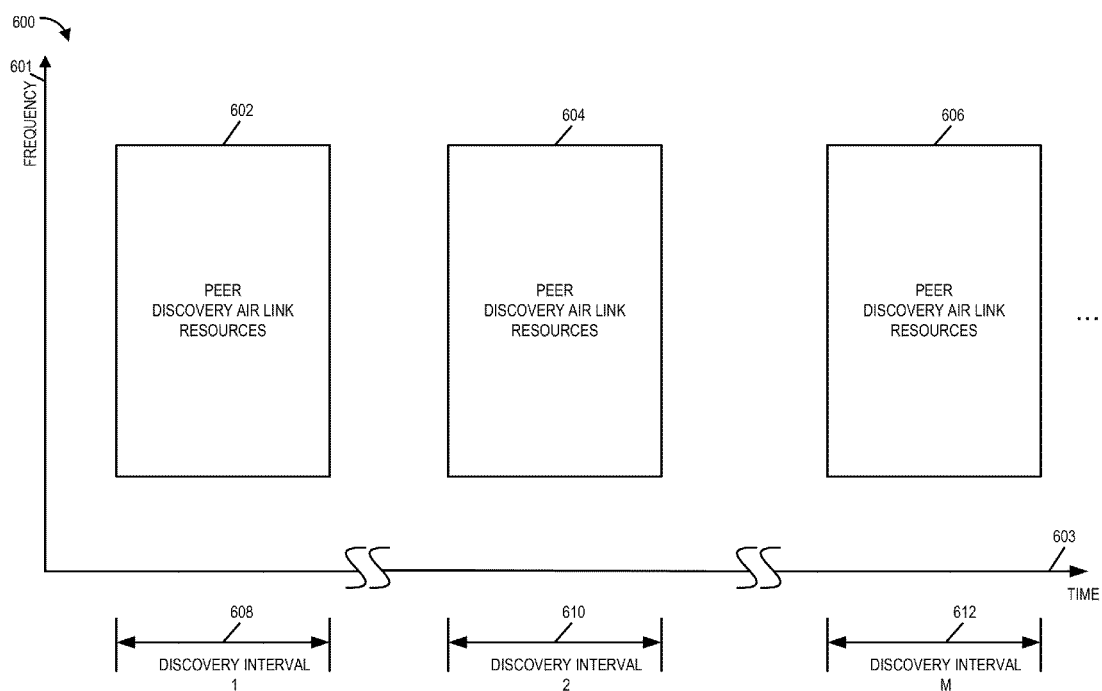
FIG. 6 is a drawing of an exemplary frequency vs time plot illustrating exemplary peer discovery air link resources in an exemplary peer to peer recurring timing structure.

FIG. 6 is a drawing of an exemplary frequency vs time plot 600 illustrating exemplary peer discovery air link resources in an exemplary peer to peer recurring timing structure. Frequency vs time plot 600 include a vertical axis 601 representing frequency, e.g., OFDM tones, and a horizontal axis 603 representing time, e.g., OFDM symbol transmission time intervals. In this example, there are M discovery intervals (discovery interval 1 608, discovery interval 2 610, . . . , discovery interval M 612) in the recurring timing structure. Peer discovery air link resources 602 occurs during discovery interval 1 608; peer discovery air link resources 604 occurs during discovery interval 2 610; and peer discovery air link resources 606 occurs during discovery interval M 612. Peer discovery air link resource 506 of FIG. 5 is, e.g., any of the peer discovery air link resource blocks (602, 604, 606) of FIG. 6.

Figure 7:
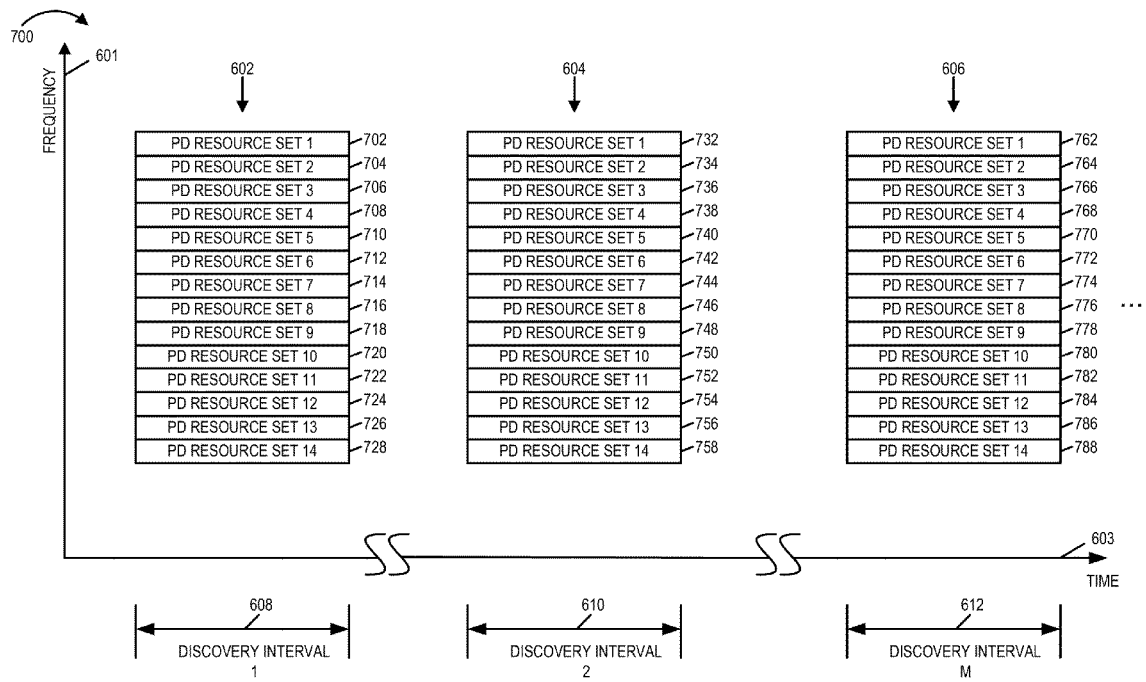
FIG. 7 is a drawing of an exemplary frequency vs time plot illustrating exemplary peer discovery resource sets within the peer discovery resource blocks illustrated in FIG. 6.

FIG. 7 is a drawing of an exemplary frequency vs time plot 700 illustrating exemplary peer discovery resource sets within the peer discovery resource blocks illustrated in FIG. 6. Peer discovery air link resources block 602 includes, in order from highest to lowest frequency, peer discovery resource set 1 702, peer discovery resource set 2 704, peer discovery resource set 3 706, peer discovery resource set 4 708, peer discovery resource set 5 710, peer discovery resource set 6 712, peer discovery resource set 7 714, peer discovery resources set 8 716, peer discovery resource set 9 718, peer discovery resource set 10 720, peer discovery resource set 11 722, peer discovery resource set 12 724, peer discovery resource set 13 726, and peer discovery resource set 14 728. Peer discovery air link resources block 604 includes, in order from highest to lowest frequency, peer discovery resource set 1 732, peer discovery resource set 2 734, peer discovery resource set 3 736, peer discovery resource set 4 738, peer discovery resource set 5 740, peer discovery resource set 6 742, peer discovery resource set 7 744, peer discovery resources set 8 746, peer discovery resource set 9 748, peer discovery resource set 10 750, peer discovery resource set 11 752, peer discovery resource set 12 754, peer discovery resource set 13 756, and peer discovery resource set 14 758. Peer discovery air link resources block 606 includes, in order from highest to lowest frequency, peer discovery resource set 1 762, peer discovery resource set 2 764, peer discovery resource set 3 766, peer discovery resource set 4 768, peer discovery resource set 5 770, peer discovery resource set 6 772, peer discovery resource set 7 774, peer discovery resources set 8 776, peer discovery resource set 9 778, peer discovery resource set 10 780, peer discovery resource set 11 782, peer discovery resource set 12 784, peer discovery resource set 13 786, and peer discovery resource set 14 788.

A peer discovery communications channel may include the peer discovery resource sets associated with a set number. For example, a first peer discovery communications channel may comprise the peer discovery resource sets associated with set number 1 (702, 732, . . . , 762). Similarly, a second peer discovery communications channel may comprise the peer discovery resource sets associated with set number 2 (704, 734, . . . , 764), and so on.

In the example of FIG. 7 a peer discovery resource block is partitioned into 14 exemplary peer discovery resource sets. In other examples, a peer discovery resource block may include a different number of peer discovery resource sets. In some such embodiments, a peer discovery resource block includes greater than 100 peer discovery resource sets. In some embodiments, the same peer discovery resource sets are not necessarily included in each successive peer discovery resource block. In some embodiments, there may be multiple peer discovery resource sets corresponding to the same tone in a peer discovery resource block, e.g., a first peer discovery resource set for a first time interval and a second peer discovery resource set for a second time interval.

Figure 8:
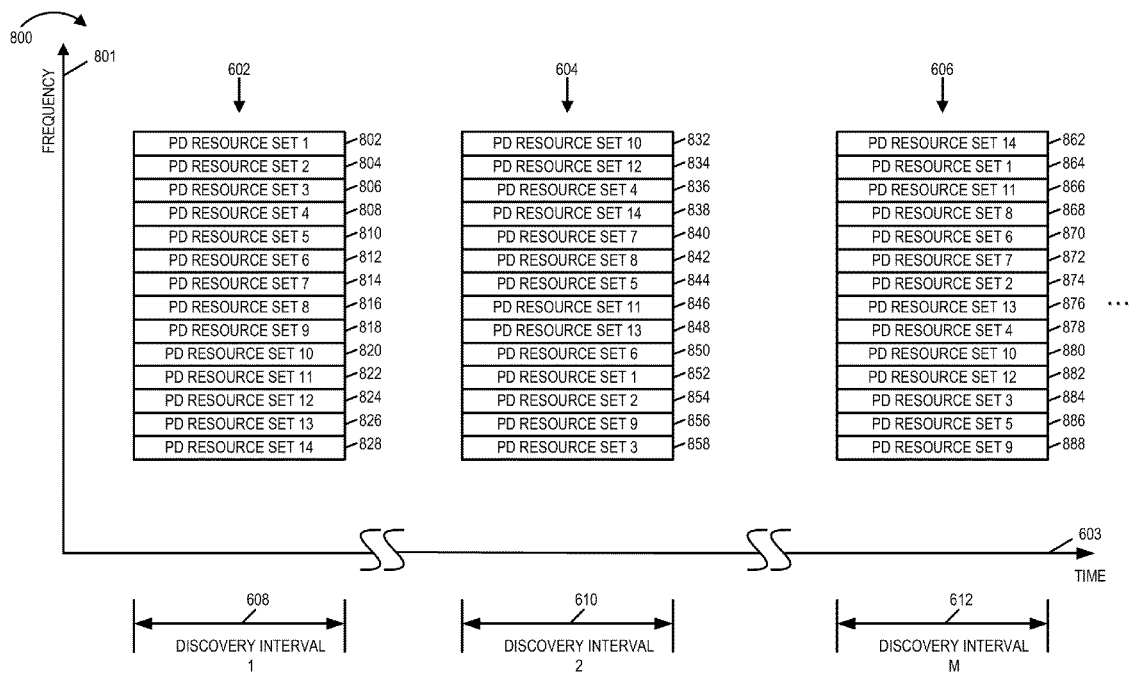
FIG. 8 is a drawing of an exemplary frequency vs time plot illustrating exemplary peer discovery resource sets within the peer discovery resource blocks illustrated in FIG. 6 for an alternative exemplary embodiment.

FIG. 8 is a drawing of an exemplary frequency vs time plot 800 illustrating exemplary peer discovery resource sets within the peer discovery resource blocks illustrated in FIG. 6 for an alternative exemplary embodiment. Peer discovery air link resources block 602 includes, in order from highest to lowest frequency, peer discovery resource set 1 802, peer discovery resource set 2 804, peer discovery resource set 3 806, peer discovery resource set 4 808, peer discovery resource set 5 810, peer discovery resource set 6 812, peer discovery resource set 7 814, peer discovery resources set 8 816, peer discovery resource set 9 818, peer discovery resource set 10 820, peer discovery resource set 11 822, peer discovery resource set 12 824, peer discovery resource set 13 826, and peer discovery resource set 14 828. Peer discovery air link resources block 604 includes, in order from highest to lowest frequency, peer discovery resource set 10 832, peer discovery resource set 12 834, peer discovery resource set 4 836, peer discovery resource set 14 838, peer discovery resource set 7 840, peer discovery resource set 8 842, peer discovery resource set 5 844, peer discovery resources set 11 846, peer discovery resource set 13 848, peer discovery resource set 6 850, peer discovery resource set 1 852, peer discovery resource set 2 854, peer discovery resource set 9 856, and peer discovery resource set 3 858. Peer discovery air link resources block 606 includes, in order from highest to lowest frequency, peer discovery resource set 14 862, peer discovery resource set 1 864, peer discovery resource set 11 866, peer discovery resource set 8 868, peer discovery resource set 6 870, peer discovery resource set 7 872, peer discovery resource set 2 874, peer discovery resources set 13 876, peer discovery resource set 4 878, peer discovery resource set 10 880, peer discovery resource set 12 882, peer discovery resource set 3 884, peer discovery resource set 5 886, and peer discovery resource set 9 888.

In the example of FIG. 8, a resource set associated with a peer discovery identifier hops from one tone to another from one peer discovery resource block to another in accordance with a predetermined hopping scheme.

A peer discovery communications channel may include the peer discovery resource sets associated with a set number. For example, a first peer discovery communications channel may comprise the peer discovery resource sets associated with set number 1 (802, 852, ..., 864). Similarly, a second peer discovery communications channel may comprise the peer discovery resource sets associated with set number 2 (804, 854, ..., 874), and so on.

Figure 9:
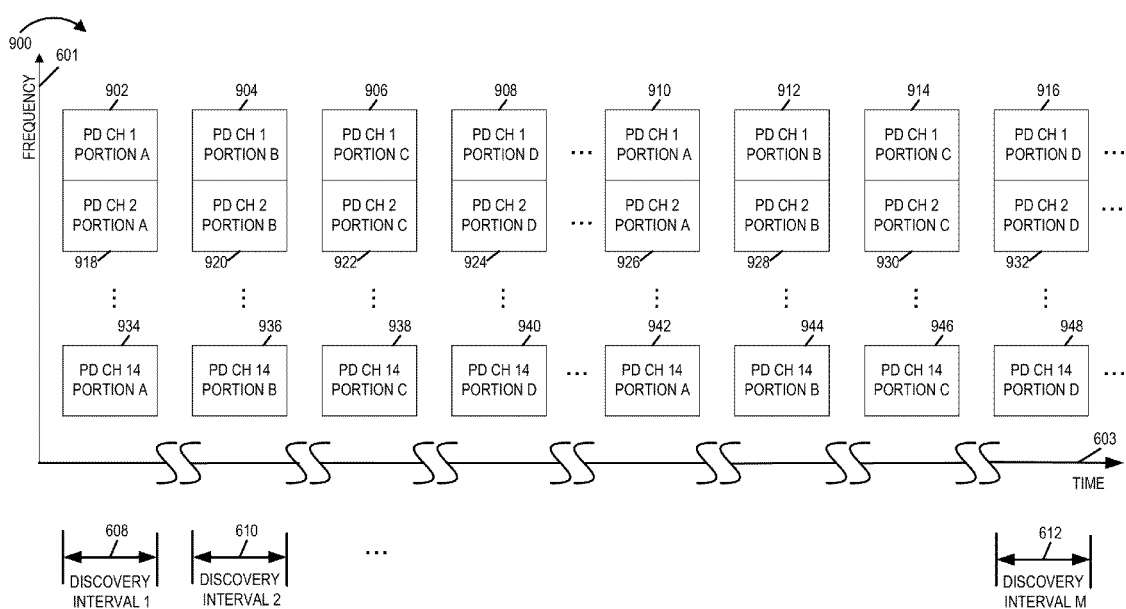
FIG. 9 is a drawing of an exemplary frequency vs time plot illustrating exemplary peer discovery channel portions in a recurring timing frequency structure.

FIG. 9 is a drawing of an exemplary frequency vs time plot 900 illustrating exemplary peer discovery channel portions in a recurring timing frequency structure. Vertical axis 601 represents frequency, e.g., OFDM tone-symbols, while horizontal axis 603 represents time, e.g., OFDM symbol transmission time intervals. In this example, there are 14 peer discovery communications channels, and M discovery intervals (discovery interval 1 608, discovery interval 2 610, ..., discovery interval M 612. Each peer discovery channel includes channel portions. Peer discovery channel 1 includes a plurality of peer discovery channel 1 portions (PD channel 1 portion A 902, PD channel 1 portion B 904, PD channel 1 portion C 906, PD channel 1 portion D 908, ..., PD channel 1 portion A 910, PD channel 1 portion B 912, PD channel 1 portion C 914, PD channel 1 portion D 916. Peer discovery channel 2 includes a plurality of peer discovery channel 2 portions (PD channel 2 portion A 918, PD channel 2 portion B 920, PD channel 2 portion C 922, PD channel 2 portion D 924, ..., PD channel 2 portion A 926, PD channel 2 portion B 928, PD channel 2 portion C 930, PD channel 2 portion D 932. Peer discovery channel 14 includes a plurality of peer discovery channel 14 portions (PD channel 14 portion A 934, PD channel 14 portion B 936, PD channel 14 portion C 938, PD channel 14 portion D 940, ..., PD channel 14 portion A 942, PD channel 14 portion B 944, PD channel 14 portion C 946, PD channel 14 portion D 948.

Each of the peer discovery channel portions of FIG. 9 may correspond to a peer discovery resource set. For example, peer discovery channel portions (PD channel 1 portion A 902, PD channel 1 portion B 904, peer discovery channel 1 portion D 916, peer discovery channel 2 portion A 918, peer discovery channel 2 portion B 920, peer discovery channel 2 portion D 932, peer discovery channel 14 portion A 934, peer discovery channel 14 portion B 936, peer discovery channel 14 portion D 948) of FIG. 9 may correspond to (peer discovery resource set 1 702, peer discovery resource set 1 732, peer discovery resource set 1 762, peer discovery resource set 2 704, peer discovery resource set 2 734, peer discovery resource set 2 764, peer discovery resource set 14 728, peer discovery resource set 14 758, peer discovery resource set 14 788) of FIG. 7.

In various embodiments, a wireless communications device monitors a recurring set of time frequency resource units, e.g., peer discovery time frequency resource units, to determine a level of congestion. Determining a level of congestion, in some embodiments, includes determining overall congestion in the peer discovery resource air link resources, and determining levels of congestion on individual channels of the peer discovery air link resource space. The wireless terminal determines a portion of a peer discovery communications channel to use for its transmission purposes as a function of the determined level of channel congestion information. The wireless communications device may, at times, determine to use a full peer discovery channel. At other times, the wireless communications device may determine to use a fraction portion of a peer discovery communications channel, where the fraction is less than 1, e.g., ¼ or ½. The wireless communications device broadcasts control information indicating the fraction of the peer discovery communications channel which is being occupied by the communications device and used for transmission.

In some embodiments, the control information is broadcast using pilot signals, e.g., one of a plurality of alternative pilot sequences communicated using peer discovery channel portions in which the wireless communications device is also communicating peer discovery data. Exemplary peer discovery data include, e.g., a device identifier, a user identifier, a group identifier, a request for a device or user, a request for a service, a request for a product, a request for information, an offer of service, an offer of a product, location information, etc.

Figure 10:
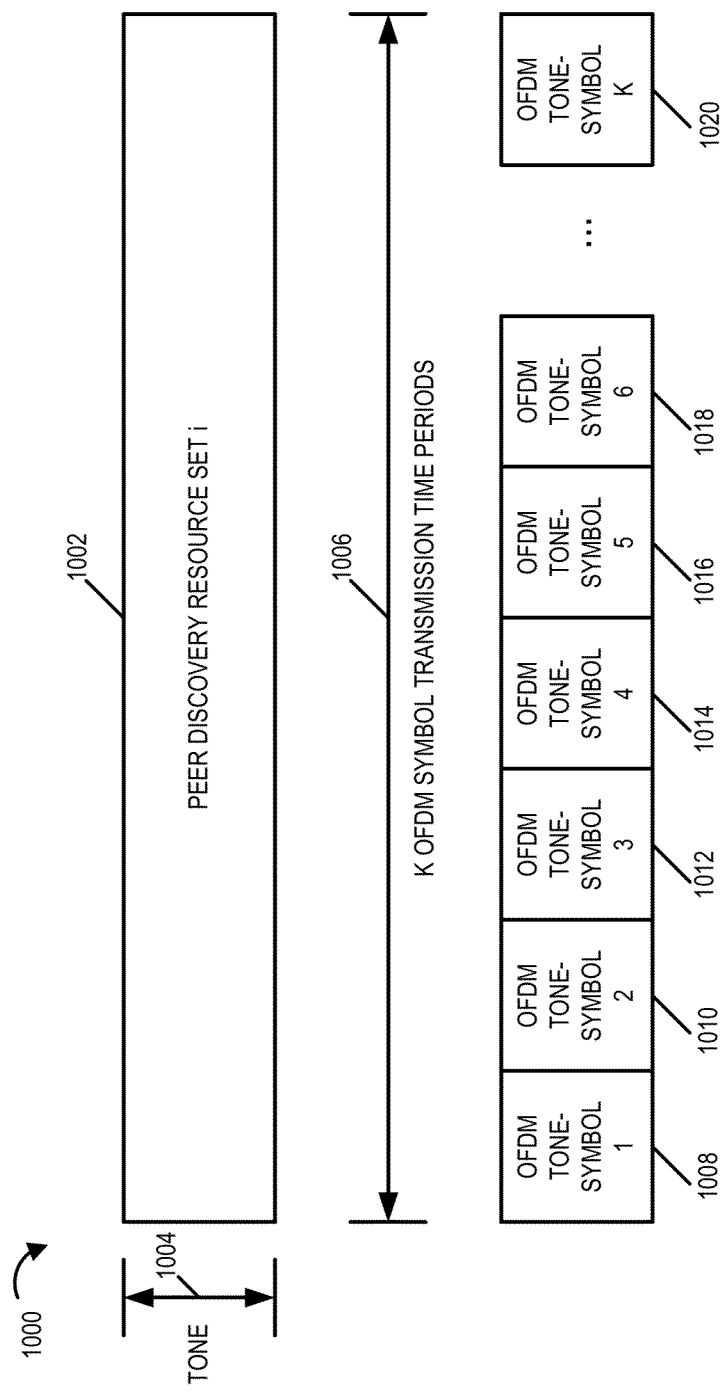
FIG. 10 is a drawing illustrating exemplary peer discovery resource set.

FIG. 10 is a drawing 1000 illustrating exemplary peer discovery resource set i 1002. Exemplary peer discovery resource set i 1002 may be any of the peer discovery resource sets illustrated in FIG. 7 or any of the peer discovery channel portions illustrated in FIG. 9. Peer discovery resource set i 1002 includes 1 tone 1004 for the time duration of K OFDM symbol transmission time periods 1006. Exemplary peer discovery resource set i 1002 may be represented as K OFDM tone-symbols (OFDM tone-symbol 1 1008, OFDM tone-symbol 2 1010, OFDM tone-symbol 3 1012, OFDM tone-symbol 4 1014, OFDM tone-symbol 5 1016, OFDM tone-symbol 6 1018, ..., OFDM tone-symbol K 1020). In some embodiments, K is an integer greater than or equal to eight. In one exemplary embodiment K=16, and there are 16 OFDM tone-symbols in a peer discovery resource set. In another exemplary embodiment K=64, and there are 64 OFDM tone-symbols in a peer discovery resource set. In some embodiments, $K_P$ of the K tone-symbols are pilot tone-symbols, where $K/K_P \geq 4$. In one embodiment K=64 and $K_P$=8. In some embodiments, the full set of K tone-symbols correspond to the same tone.

Figure 11:
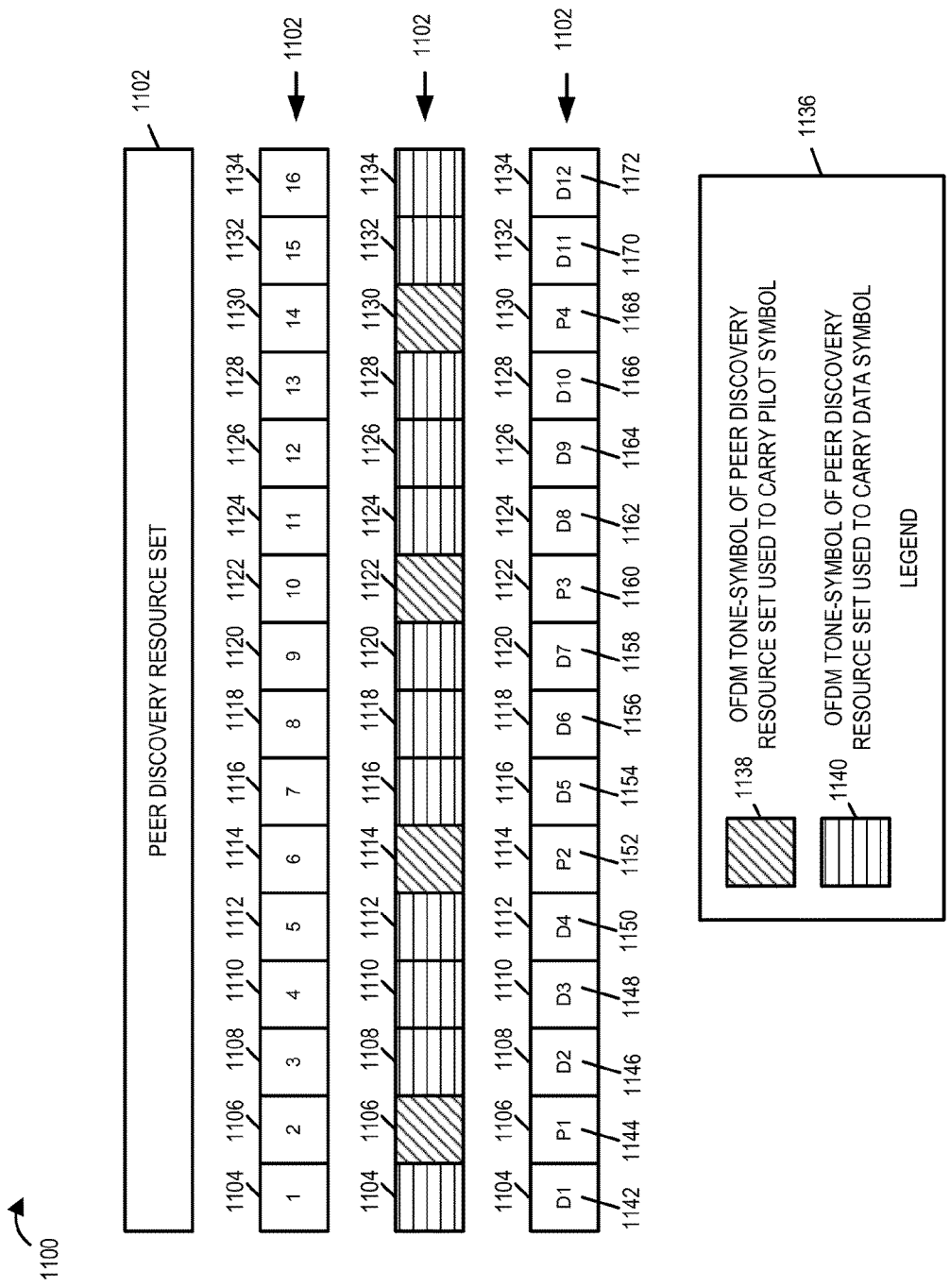
FIG. 11 is a drawing illustrating an exemplary peer discovery resource set used to carry pilot and data symbols.

FIG. 11 is a drawing 1100 illustrating an exemplary peer discovery resource set 1102 used to carry pilot and data symbols. Peer discovery resource set 1102 is, e.g., peer discovery resource set 1002 of FIG. 10, where K=16 and $K_P$=4. Exemplary peer discovery resource set 1102 includes 16 indexed OFDM tone-symbols (tone-symbol 1 1104, tone symbol 2 1106, tone-symbol 3 1108, tone-symbol 4 1110, tone-symbol 5 1112, tone-symbol 6 1114, tone-symbol 7 1116, tone-symbol 8 1118, tone-symbol 9 1120, tone-symbol 10 1122, tone-symbol 11 1124, tone-symbol 12 1126, tone-symbol 13 1128, tone-symbol 14 1130, tone-symbol 15 1132 and tone-symbol 16 1134).

Diagonal line shading, as indicated by box 1138 of legend 1136, indicates that an OFDM tone-symbol of the peer discovery resource set is used to carry a pilot symbol. Horizontal line shading, as indicated by box 1140 of legend 1136, indicates that an OFDM tone-symbol of the peer discovery resource set is used to carry a data symbol. In this example a first subset of tone-symbols (1106, 1114, 1122 and 1130) are designated to be used to carry pilot symbols, while a second non-overlapping subset of tone-symbols (1104, 1108, 1110, 1112, 1116, 1118, 1120, 1124, 1126, 1128, 1132, 1134) are used to carry the data symbols. In this example, the spacing between pilot designated tone-symbols is uniform with multiple data symbol designated tone-symbols being interspaced between the pilot designated tone-symbols. In some embodiments, the spacing between pilot designated tone-symbols is substantially uniform. In one embodiment, the tone-symbols designated to carry pilot symbols temporally precede the tone-symbols designated to carry data symbols. In some embodiments, the first and last tone-symbols of the peer discovery resource set are designated to carry pilot symbols.

In the example of FIG. 11, tone-symbols (1106, 1114, 1122 and 1130) carry pilot symbols (P1 1144, P2 1152, P3 1160 and P4 1168), respectively. In the example of FIG. 11, tone-symbols (1104, 1108, 1110, 1112, 1116, 1118, 1120, 1124, 1126, 1128, 1132, 1134) carry data symbols (D1 1142, D2 1146, D3 1148, D4 1150, D5 1154, D6 1156, D7 1158, D8 1162, D9 1164, D10 1166, D11 1170, D12 1172), respectively.

Figure 12:
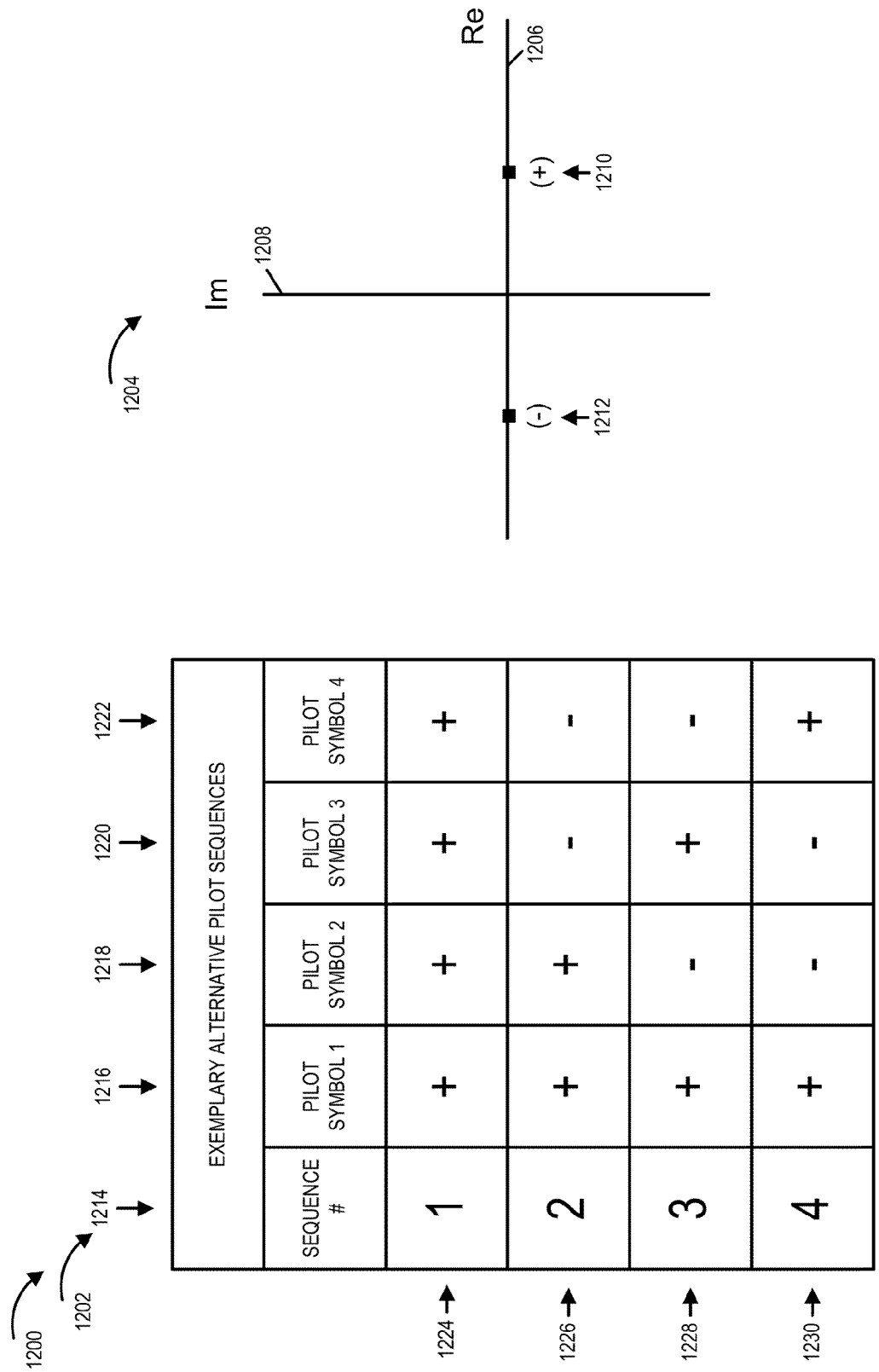
FIG. 12 is a drawing illustrating a table of exemplary alternative pilot sequences and a plot illustrating mapping of a set of two pilot symbols to a complex plane.

FIG. 12 is a drawing 1200 illustrating a table of exemplary alternative pilot sequences 1202 and a plot 1204 illustrating mapping of a set of two pilot symbols to a complex plane. Plot 1204 includes horizontal axis 1206 representing the real axis and vertical axis 1208 representing the Imaginary axis. Pilot symbol designated as "+" 1210 maps along the real axis with a phase angle of 0 degrees, while a pilot symbol designated as "−" 1212 maps along the real axis with a phase angle of 180 degrees. The transmit power level of the "+" pilot symbol is the same as the transmit power level of the "−" pilot symbol.

Table 1202 includes a first column 1214 representing pilot sequence number, a second column 1216 identifying pilot symbol 1 for each of the alternative pilot sequences, a third column 1218 identifying pilot symbol 2 for each of the alternative pilot sequences, a fourth column 1220 identifying pilot symbol 3 for each of the alternative pilot sequences, and a fifth column 1222 identifying pilot symbol 4 for each of the alternative pilot sequences. First row 1224 indicates that pilot sequence 1 follows the pattern +, +, +, +. Second row 1226 indicates that pilot sequence 2 follows the pattern +, +, −, −. Third row 1228 indicates that pilot sequence 3 follows the pattern +, −, +, −. Fourth row 1230 indicates that pilot sequence 4 follows the pattern +, −, −, +.

Figure 13:
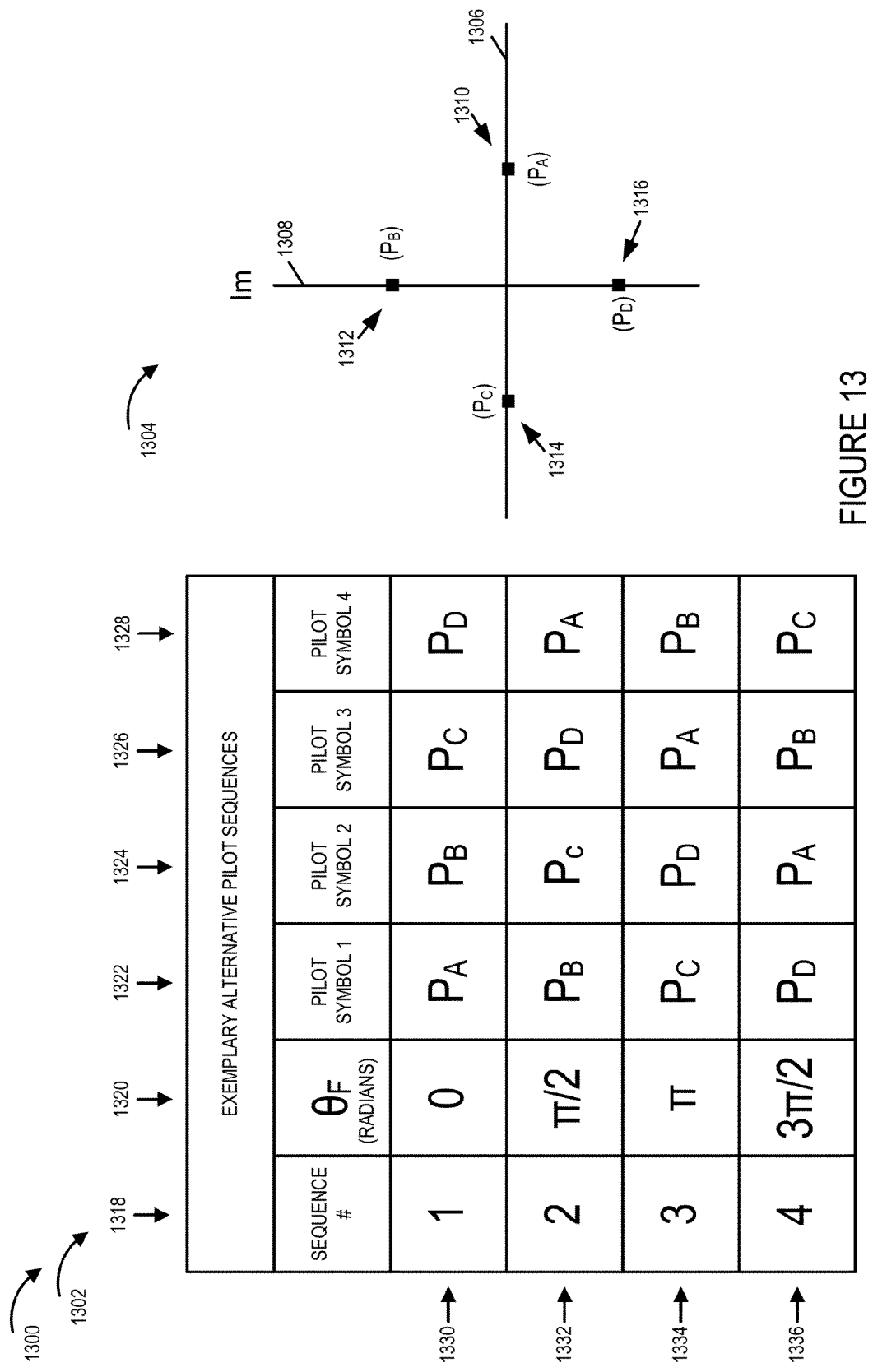
FIG. 13 is a drawing illustrating a table of exemplary alternative pilot sequences and a plot illustrating mapping of a set of four pilot symbols to a complex plane.

FIG. 13 is a drawing 1300 illustrating a table of exemplary alternative pilot sequences 1302 and a plot 1304 illustrating mapping of a set of four pilot symbols to a complex plane. The FIG. 13 embodiment is an alternative to the FIG. 12 embodiment. Plot 1304 includes horizontal axis 1306 representing the real axis and vertical axis 1308 representing the Imaginary axis. Pilot symbol 1310 designated as "$P_A$" maps along the positive real axis corresponding to a phase angle of 0 degrees. Pilot symbol 1312 designated as "$P_B$" maps along the positive Imaginary axis corresponding to a phase angle of 90 degrees. Pilot symbol 1314 designated as "$P_C$" maps along the negative real axis corresponding to a phase angle of 180 degrees. Pilot symbol 1316 designated as "$P_D$" maps along the negative Imaginary axis corresponding to a phase angle of 270 degrees. The transmit power level for each of the pilot symbols $P_A$, $P_B$, $P_C$ and $P_D$ is the same.

Table 1302 includes: a first column 1318 representing pilot sequence number, a second column 1320 identifying an offset for the pilot sequence which indicates where the first pilot symbol of the sequence is located, a third column 1322 identifying pilot symbol 1 for each of the alternative pilot sequences, a fourth column 1324 identifying pilot symbol 2 for each of the alternative pilot sequences, a fifth column 1326 identifying pilot symbol 3 for each of the alternative pilot sequences, a sixth column 1328 identifying pilot symbol 4 for each of the alternative pilot sequences. First row 1330 indicates that pilot sequence 1 corresponds to an offset of 0 radians and follows the pattern $P_A$, $P_B$, $P_C$, $P_D$. Second row 1132 indicates that pilot sequence 2 corresponds to an offset of $\pi/2$ radians and follows the pattern $P_B$, $P_C$, $P_D$, $P_A$. Third row 1334 indicates that pilot sequence 3 corresponds to an offset of $\pi$ radians and follows the pattern $P_C$, $P_D$, $P_A$, $P_B$. Fourth row 1336 indicates that pilot sequence 4 corresponds to a phase rotation of $3\pi/2$ radians and follows the pattern $P_D$, $P_A$, $P_B$, $P_C$.

FIGS. 12 and 13 are examples in which there are four pilot sequences and four pilots per sequence. In other embodiments, there may be different numbers of alternative pilot sequences used and/or different numbers of pilots per sequence.

Figure 14:
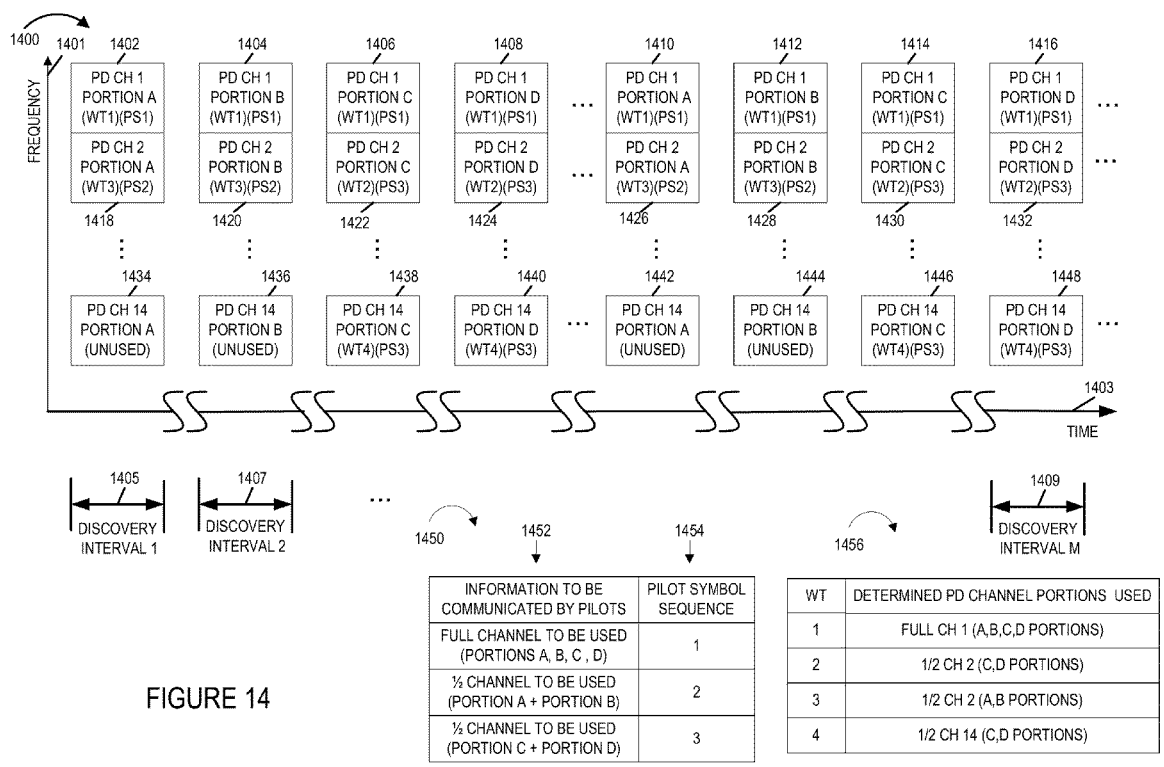
FIG. 14 is a drawing illustrating an example in an exemplary embodiment in which a wireless device determines portions of peer discovery communications channel to use for its peer discovery signal transmissions, as a function of a determined level of network congestion, and communicates its channel portion usage information via broadcast pilot symbol sequences.

FIG. 14 is a drawing including an exemplary frequency vs time plot 1400 illustrating exemplary peer discovery channel portions in a recurring timing frequency structure. Vertical axis 1401 represents frequency, e.g., OFDM tone-symbols, while horizontal axis 1403 represents time, e.g., OFDM symbol transmission time intervals. In this example, there are 14 peer discovery communications channels, and M discovery intervals (discovery interval 1 1405, discovery interval 2 1407, . . . , discovery interval M 1409.

Plot 1400 of FIG. 14 may be a representation of plot 900 of FIG. 9 which further includes information indicating which peer discovery channel portions are being used for transmission by which devices and which pilot sequences are being transmitted on individual peer discovery channel potions in this example.

Table 1450 indicates that, in this exemplary embodiment, there is a relationship between the particular pilot sequence transmitted and amount of peer discovery channel resources used and which peer discovery channel portion are used by a transmitting device. Column 1452 indicates the information to be communicated by pilots and column 1454 indicates the pilot sequence number. Table 1450 indicates that if a wireless terminal is using a full peer discovery channel (portions A, B, C, and D), the wireless terminal transmits pilot sequence 1. Table 1450 further indicates that if a wireless terminal is using ½ of a peer discovery communications channel and is using the first half (portion A and portion B), then the wireless terminal transmits pilot sequence 2. Table 1450 also indicates that if a wireless terminal is using ½ of a peer discovery communications channel and is using the second portion (portion C and portion D), then the wireless terminal transmits pilot sequence 3.

Table 1456 identifies 4 exemplary wireless terminals which have determined to used peer discovery channel portions and identifies the channel portions on which each wireless terminal is transmitting peer discovery pilots and data. Table 1456 identifies that WT 1 has determined to use full peer discovery channel 1 and thus transmits on A, B, C and D channel 1 peer discovery portions. In accordance with table 1450 wireless terminal 1 transmits pilot sequence 1. Block 1402 indicates that peer discovery channel 1 portion A 902 is being used by WT 1 which is transmitting pilot sequence 1. Block 1404 indicates that peer discovery channel 1 portion B 904 is being used by WT 1 which is transmitting pilot sequence 1. Block 1406 indicates that peer discovery channel 1 portion C 906 is being used by WT 1 which is transmitting pilot sequence 1. Block 1408 indicates that peer discovery channel 1 portion D 908 is being used by WT 1 which is transmitting pilot sequence 1. Block 1410 indicates that peer discovery channel 1 portion A 910 is being used by WT 1 which is transmitting pilot sequence 1. Block 1412 indicates that peer discovery channel 1 portion B 912 is being used by WT 1 which is transmitting pilot sequence 1. Block 1414 indicates that peer discovery channel 1 portion C 914 is being used by WT 1 which is transmitting pilot sequence 1. Block 1416 indicates that peer discovery channel 1 portion D 916 is being used by WT 1 which is transmitting pilot sequence 1.

Table 1456 identifies that WT 2 has determined to use the second ½ of peer discovery channel 2 and thus transmits on C and D channel 2 peer discovery portions. In accordance with table 1450 wireless terminal 2 transmits pilot sequence 3. Block 1422 indicates that peer discovery channel 2 portion C 922 is being used by WT 2 which is transmitting pilot sequence 3. Block 1424 indicates that peer discovery channel 2 portion D 924 is being used by WT 2 which is transmitting pilot sequence 3. Block 1430 indicates that peer discovery channel 2 portion C 930 is being used by WT 2 which is transmitting pilot sequence 3. Block 1432 indicates that peer discovery channel 2 portion D 932 is being used by WT 2 which is transmitting pilot sequence 3.

Table 1456 further identifies that WT 3 has determined to use the first ½ of peer discovery channel 2 and thus transmits on A and B channel 2 peer discovery portions. In accordance with table 1450 wireless terminal 3 transmits pilot sequence 2. Block 1418 indicates that peer discovery channel 2 portion A 918 is being used by WT 3 which is transmitting pilot sequence 2. Block 1420 indicates that peer discovery channel 2 portion B 920 is being used by WT 3 which is transmitting pilot sequence 2. Block 1426 indicates that peer discovery channel 2 portion A 926 is being used by WT 3 which is transmitting pilot sequence 2. Block 1428 indicates that peer discovery channel 2 portion B 928 is being used by WT 3 which is transmitting pilot sequence 2.

Table 1456 also identifies that WT 4 has determined to use the second ½ of peer discovery channel 14 and thus transmits on C and D channel 14 peer discovery portions. In accordance with table 1450 wireless terminal 4 transmits pilot sequence 3. Block 1438 indicates that peer discovery channel 14 portion C 938 is being used by WT 4 which is transmitting pilot sequence 3. Block 1440 indicates that peer discovery channel 14 portion D 940 is being used by WT 4 which is transmitting pilot sequence 3. Block 1446 indicates that peer discovery channel 14 portion C 946 is being used by WT 4 which is transmitting pilot sequence 3. Block 1448 indicates that peer discovery channel 14 portion D 948 is being used by WT 4 which is transmitting pilot sequence 3. Blocks (1434, 1436, 1442, 1442) indicate that portions (934, 936, 942, 944), respectively, of peer discovery channel 14 are currently unused.

Figure 15:
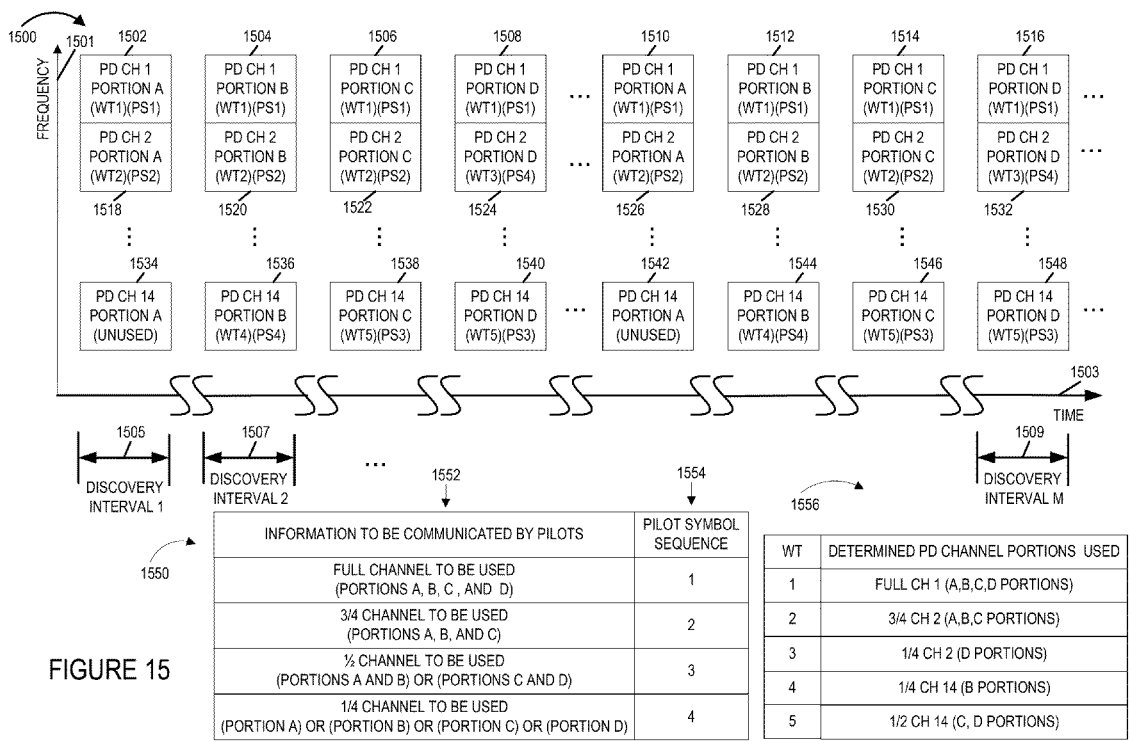
FIG. 15 is a drawing illustrating an example in another exemplary embodiment in which a wireless device determines portions of peer discovery communications channel to use for its peer discovery signal transmissions, as a function of a determined level of network congestion, and communicates its channel portion usage information via broadcast pilot symbol sequences.

FIG. 15 is a drawing including an exemplary frequency vs time plot 1500 illustrating exemplary peer discovery channel portions in a recurring timing frequency structure. Vertical axis 1501 represents frequency, e.g., OFDM tone-symbols, while horizontal axis 1503 represents time, e.g., OFDM symbol transmission time intervals. In this example, there are 14 peer discovery communications channels, and M discovery intervals (discovery interval 1 1505, discovery interval 2 1507, . . . , discovery interval M 1509.

Plot 1500 of FIG. 15 may be a representation of plot 900 of FIG. 9 which further includes information indicating which peer discovery channel portions are be used for transmission by which devices and which pilot sequences are being transmitted on individual peer discovery channel potions in this example.

Table 1550 indicates that, in this exemplary embodiment, there is a relationship between the particular pilot sequence transmitted and amount of peer discovery channel resources used and which peer discovery channel portion are used by a transmitting device. The exemplary embodiment described by table 1550 of FIG. 15 is an alternative to the exemplary embodiment of table 1450 of FIG. 14. Column 1552 indicates the information to be communicated by pilots and column 1554 indicates the pilot sequence number. Table 1550 indicates that if a wireless terminal is using a full peer discovery channel (portions A, B, C, and D), the wireless terminal transmits pilot sequence 1. Table 1550 further indicates that if a wireless terminal is using ¾ of a peer discovery communications channel and is using portions A, B and C, then the wireless terminal transmits pilot sequence 2. Table 1550 further indicates that if a wireless terminal is using ½ of a peer discovery communications channel and is using either the first half (portion A and portion B) or the second half (portion C and portion D), then the wireless terminal transmits pilot sequence 3. Table 1450 also indicates that if a wireless terminal is using ¼ of a peer discovery communications channel which can be any one of portion A, portion B, portion C and portion D, then the wireless terminal transmits pilot sequence 4.

Table 1556 identifies 5 exemplary wireless terminals which have determined to use peer discovery channel portions and identifies the channel portions on which each wireless terminal is transmitting peer discovery pilots and data. Table 1556 identifies that WT 1 has determined to use full peer discovery channel 1 and thus transmits on A, B, C and D channel 1 peer discovery portions. In accordance with table 1550 wireless terminal 1 transmits pilot sequence 1. Block 1502 indicates that peer discovery channel 1 portion A 902 is being used by WT 1 which is transmitting pilot sequence 1. Block 1504 indicates that peer discovery channel 1 portion B 904 is being used by WT 1 which is transmitting pilot sequence 1. Block 1506 indicates that peer discovery channel 1 portion C 906 is being used by WT 1 which is transmitting pilot sequence 1. Block 1508 indicates that peer discovery channel 1 portion D 908 is being used by WT 1 which is transmitting pilot sequence 1. Block 1510 indicates that peer discovery channel 1 portion A 910 is being used by WT 1 which is transmitting pilot sequence 1. Block 1512 indicates that peer discovery channel 1 portion B 912 is being used by WT 1 which is transmitting pilot sequence 1. Block 1514 indicates that peer discovery channel 1 portion C 914 is being used by WT 1 which is transmitting pilot sequence 1. Block 1516 indicates that peer discovery channel 1 portion D 916 is being used by WT 1 which is transmitting pilot sequence 1.

Table 1556 identifies that WT 2 has determined to use the second ¾ of peer discovery channel 2 and thus transmits on A, B and C channel 2 peer discovery portions. In accordance with table 1550 wireless terminal 2 transmits pilot sequence 2. Block 1518 indicates that peer discovery channel 2 portion A 918 is being used by WT 2 which is transmitting pilot sequence 2. Block 1520 indicates that peer discovery channel 2 portion B 920 is being used by WT 2 which is transmitting pilot sequence 2. Block 1522 indicates that peer discovery channel 2 portion C 922 is being used by WT 2 which is transmitting pilot sequence 2. Block 1526 indicates that peer discovery channel 2 portion A 926 is being used by WT 2 which is transmitting pilot sequence 2. Block 1528 indicates that peer discovery channel 2 portion B 928 is being used by WT 2 which is transmitting pilot sequence 2. Block 1530 indicates that peer discovery channel 2 portion A 930 is being used by WT 2 which is transmitting pilot sequence 2.

Table 1556 further identifies that WT 3 has determined to use the last ¼ of peer discovery channel 2 and thus transmits on channel 2 peer discovery D portions. In accordance with table 1550 wireless terminal 3 transmits pilot sequence 4. Block 1524 indicates that peer discovery channel 2 portion D 924 is being used by WT 3 which is transmitting pilot sequence 4. Block 1532 indicates that peer discovery channel 2 portion D 932 is being used by WT 3 which is transmitting pilot sequence 4.

Table 1556 further identifies that WT 4 has determined to use the second ¼ of peer discovery channel 14 and thus transmits on channel 14 peer discovery B portions. In accordance with table 1550 wireless terminal 4 transmits pilot sequence 4. Block 1536 indicates that peer discovery channel 14 portion B 936 is being used by WT 4 which is transmitting pilot sequence 4. Block 1544 indicates that peer discovery channel 14 portion B 944 is being used by WT 4 which is transmitting pilot sequence 4.

Table 1556 further identifies that WT 5 has determined to use the second half of peer discovery channel 14 and thus transmits on C and D channel 14 peer discovery portions. In accordance with table 1550 wireless terminal 5 transmits pilot sequence 3. Block 1538 indicates that peer discovery channel 14 portion C 938 is being used by WT 5 which is transmitting pilot sequence 3. Block 1540 indicates that peer discovery channel 14 portion D 940 is being used by WT 5 which is transmitting pilot sequence 3. Block 1546 indicates that peer discovery channel 14 portion C 946 is being used by WT 5 which is transmitting pilot sequence 3. Block 1548 indicates that peer discovery channel 14 portion D 948 is being used by WT 5 which is transmitting pilot sequence 3. Blocks (1534, 1542) indicate that portions (934, 942), respectively, of peer discovery channel 14 are currently unused.

It should be appreciated that encoded information communicating channel usage portions and/or which particular portions are being used and/or fraction channel usage information, e.g., as indicted in exemplary tables 1452 and 1552, can be advantageous in terms of efficient operation of monitoring devices. A receiving device need not, and in some embodiments, does not, monitor each peer discovery portion of a channel to determine the status of the channel. For example, with regard to the example of FIG. 15, a device can ascertain from the detection of pilot sequence 1 in any one of the portions of the channel that the entire channel is already taken. As another example, a receiving device can determine by the detection of pilot sequence 2 on any one of an A portion, B portion of C portion, that portions A, B and C of the channel are already taken.

Figure 16:
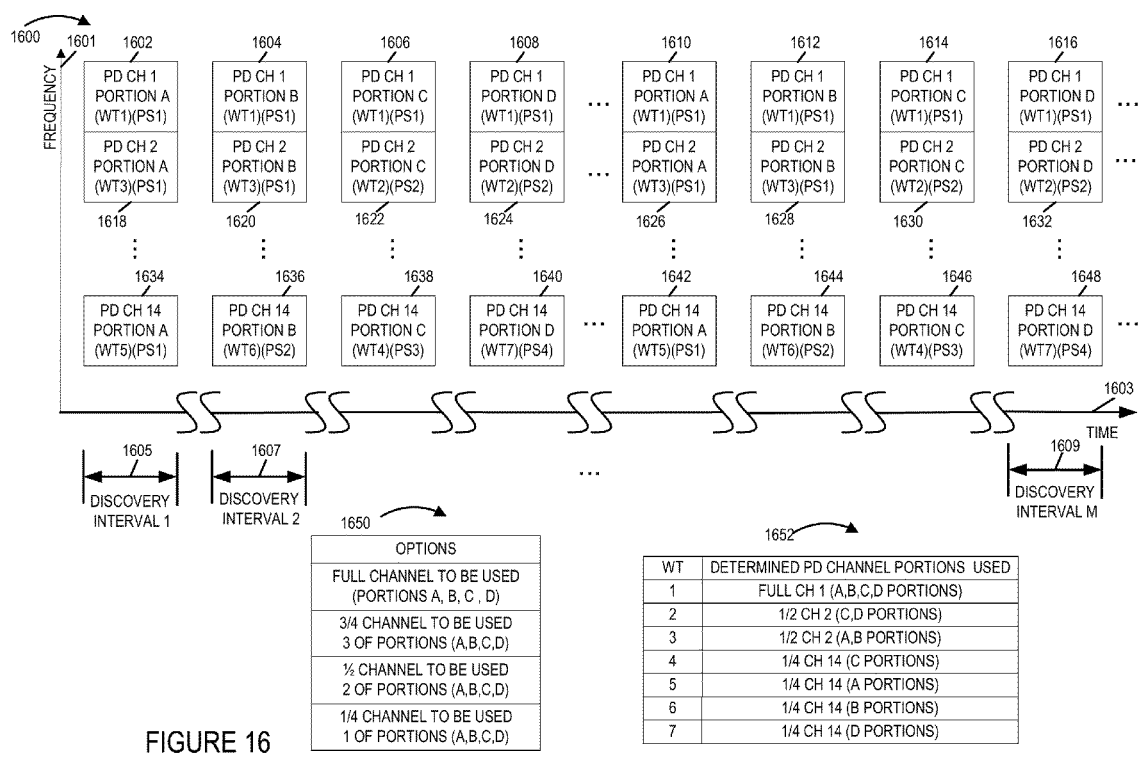
FIG. 16 is a drawing illustrating an example in another exemplary embodiment in which a wireless device determines portions of a peer discovery communications channel to use for its peer discovery signal transmissions, as a function of a determined level of network congestion, and communicates its channel portion usage information via broadcast pilot symbol sequences.

FIG. 16 is a drawing including an exemplary frequency vs time plot 1600 illustrating exemplary peer discovery channel portions in a recurring timing frequency structure. Vertical axis 1601 represents frequency, e.g., OFDM tone-symbols, while horizontal axis 1603 represents time, e.g., OFDM symbol transmission time intervals. In this example, there are 14 peer discovery communications channels, and M discovery intervals (discovery interval 1 1605, discovery interval 2 1607, . . . , discovery interval M 1609.

Plot 1600 of FIG. 16 may be a representation of plot 900 of FIG. 9 which further includes information indicating which peer discovery channel portions are be used for transmission by which devices and which pilot sequences are being transmitted on individual peer discovery channel potions in this example.

Table 1650 indicates various channel usage options that are available to a wireless terminal with regard to transmitting peer discovery signals. A wireless terminal may decide to use a full peer discovery channel, in which case it uses each of the A, B, C and D portions of the channel. A wireless terminal may decide to use ¾ of a channel in which case its uses 3 of the A, B, C and D portions of the channel. A wireless terminal may decide to use ½ of a channel in which case its uses 2 of the A, B, C and D portions of the channel. A wireless terminal may decide to use ¼ of a channel in which case its uses 1 of the A, B, C and D portions of the channel.

In this exemplary embodiment, a wireless terminal which has decided to use a channel, determines from monitoring, which pilot sequences are already by other devices transmitting into the channel and which pilot sequences are currently unused with respect to the channel. Then the wireless terminal selects, e.g., pseudo-randomly, a pilot sequence to use for its transmissions from among the unused pilot sequences.

Table 1652 identifies 4 exemplary wireless terminals which have determined to use peer discovery channel portions and identifies the channel portions on which each wireless terminal is transmitting peer discovery pilots and data. Table 1652 identifies that WT 1 has determined to use full peer discovery channel 1 and thus transmits on A, B, C and D channel 1 peer discovery portions. In this example WT 1 has selected to use pilot sequence 1. Block 1602 indicates that peer discovery channel 1 portion A 902 is being used by WT 1 which is transmitting pilot sequence 1. Block 1604 indicates that peer discovery channel 1 portion B 904 is being used by WT 1 which is transmitting pilot sequence 1. Block 1606 indicates that peer discovery channel 1 portion C 906 is being used by WT 1 which is transmitting pilot sequence 1. Block 1608 indicates that peer discovery channel 1 portion D 908 is being used by WT 1 which is transmitting pilot sequence 1. Block 1610 indicates that peer discovery channel 1 portion A 910 is being used by WT 1 which is transmitting pilot sequence 1. Block 1612 indicates that peer discovery channel 1 portion B 912 is being used by WT 1 which is transmitting pilot sequence 1. Block 1614 indicates that peer discovery channel 1 portion C 914 is being used by WT 1 which is transmitting pilot sequence 1. Block 1616 indicates that peer discovery channel 1 portion D 916 is being used by WT 1 which is transmitting pilot sequence 1.

Table 1652 identifies that WT 2 has determined to use ½ of peer discovery channel 2 and is transmitting on C and D channel 2 peer discovery portions. In this example WT 2 has selected to use pilot sequence 2. Block 1622 indicates that peer discovery channel 2 portion C 922 is being used by WT 2 which is transmitting pilot sequence 2. Block 1624 indicates that peer discovery channel 2 portion D 924 is being used by WT 2 which is transmitting pilot sequence 2. Block 1630 indicates that peer discovery channel 2 portion C 930 is being used by WT 2 which is transmitting pilot sequence 2. Block 1632 indicates that peer discovery channel 2 portion D 932 is being used by WT 2 which is transmitting pilot sequence 2.

Table 1652 further identifies that WT 3 has determined to use ½ of peer discovery channel 2 and transmits on A and B channel 2 peer discovery portions. In this example wireless terminal 3 has selected to transmit pilot sequence 1. Block 1618 indicates that peer discovery channel 2 portion A 918 is being used by WT 3 which is transmitting pilot sequence 1. Block 1620 indicates that peer discovery channel 2 portion B 920 is being used by WT 3 which is transmitting pilot sequence 1. Block 1626 indicates that peer discovery channel 2 portion A 926 is being used by WT 3 which is transmitting pilot sequence 1. Block 1628 indicates that peer discovery channel 2 portion B 928 is being used by WT 3 which is transmitting pilot sequence 1.

Table 1652 also identifies that WT 4 has determined to use ¼ of peer discovery channel 14 and transmits on channel 14 peer discovery C portions. Wireless terminal 4 has selected to transmit pilot sequence 3. Block 1638 indicates that peer discovery channel 14 portion C 938 is being used by WT 4 which is transmitting pilot sequence 3. Block 1646 indicates that peer discovery channel 14 portion C 946 is being used by WT 4 which is transmitting pilot sequence 3.

Table 1652 further identifies that WT 5 has determined to use ¼ of peer discovery channel 14 and transmits on channel 14 peer discovery A portions. Wireless terminal 5 has selected to transmit pilot sequence 1. Block 1634 indicates that peer discovery channel 14 portion A 934 is being used by WT 5 which is transmitting pilot sequence 1. Block 1642 indicates that peer discovery channel 14 portion A 942 is being used by WT 5 which is transmitting pilot sequence 1.

Table 1652 also identifies that WT 6 has determined to use ¼ of peer discovery channel 14 and transmits on channel 14 peer discovery B portions. Wireless terminal 6 has selected to transmit pilot sequence 2. Block 1636 indicates that peer discovery channel 14 portion B 936 is being used by WT 6 which is transmitting pilot sequence 2. Block 1644 indicates that peer discovery channel 14 portion B 944 is being used by WT 6 which is transmitting pilot sequence 2.

Table 1652 also identifies that WT 7 has determined to use ¼ of peer discovery channel 14 and transmits on channel 14 peer discovery D portions. Wireless terminal 7 has selected to transmit pilot sequence 4. Block 1640 indicates that peer discovery channel 14 portion D 940 is being used by WT 7 which is transmitting pilot sequence 4. Block 1648 indicates that peer discovery channel 14 portion D 948 is being used by WT 7 which is transmitting pilot sequence 4.

One particular exemplary embodiment will now be described in which various features are used with respect to the communication of peer identifiers using peer identification communications resources. In the particular exemplary embodiment, after a device, e.g., wireless terminal, joins the network, it keeps silent from time to time during a recurring time period it uses for communicating a peer ID and senses the congestion level of the network. When multiple wireless terminals share the same peer ID resource, e.g., peer ID channel corresponding to a set of peer ID resources, they remain silent and monitor for congestion at different times. For example, consider a case where Walsh sequences are used as pilot phase codebook. In this case, a device can, and in some embodiments does, perform a fast Hadamard transform (FHT) and check based on the pilot sequences how many other devices are using the same peer ID resource, e.g., channel, based on the detected Wash sequences on the resources corresponding to the particular peer ID channel. The number of detectable devices alone or in combination with the detected signal strength corresponding to different pilot sequences can be used to give a measurement of the congestion level of the network, e.g., the number of devices trying to share the same resource or set of resources.

After the congestion level of the network is determined, the device can now decide the level of backoff, in terms of resource utilization, it should take to alleviate the congestion level of the network, e.g., it can choose the periodicity it transmits in its peer ID resource or channel. A lower periodicity can be selected in the case of a high level of network congestion than when a lower level of network congestion is detected. When the network is not congested, i.e., there is no other devices reusing the same peer ID resource, the device can keep transmitting during each available peer ID transmission period. On the other hand, when the network is congested, the device can choose to transmit during a fraction of the peer ID transmission intervals. One method is to have devices backoff randomly when they sense congestion. When locally orthogonal pilot phases are available though, the device can do better than that by choosing the fraction to transmit based on its pilot phase. Since the pilot phase maybe locally unique, each device can pick a fraction which is locally orthogonal to the choices of other devices sharing the same peer ID resource. Further, the fraction a device transmits maybe based on the congestion level of the network, i.e. when the network is gets denser, the device transmits during a smaller fraction of peer ID intervals using in the particular peer ID resource.

Now let us look at a more concrete example. Assuming that 8 pilot phases are available in the network and that when devices join the network, they acquire and maintain pilot phases such that they are locally orthogonal. When a device senses that there are two devices using the same peer ID resource, it reduces the fraction of its transmission to ½. In one embodiment which ½ it transmits can be dependent on its pilot phases, i.e. devices with pilot phase index between 1 and 4 transmits on even slots and devices with pilot phase index between 5 and 8 transmit on odd ones. On the other hand, when a user senses that there are more than two but not more than four users in the same peer ID resource, it only transmits ¼ of the time slots, so on and so forth. Similarly, when there actually more than four users in the same peer ID resource, the device can choose ⅛ of the time slots, wherein the time slots a device transmits are determined by its pilot phase. As should be appreciated, numerous other variations are also possible.

Various exemplary methods and apparatus are related to determining a portion of a channel, e.g., a peer discovery channel, to use in a communications network. Various exemplary methods and apparatus are well suited for use in an ad hoc peer to peer network, e.g., a network in which wireless terminals directly communicate with one another without the involvement of a central network controller. In the communications network, a channel includes a recurring set of time/frequency resources, and there is a plurality of such channels available to support peer discovery. Each device intending to broadcast peer discovery information picks one of the peer discovery channels to use to broadcast its peer discovery information, and it is possible that multiple devices might pick the same channel and cause a collision. In this case, some devices might not be able to decode information communicated on said communications channel due to said collision. A device monitors the congestion level of the network and decides to use the whole picked channel or a fractional portion of the picked channel (e.g., ½, ¼) as a function of the congestion level. The device may, and sometimes does, change the amount of the channel it occupies as the congestion level changes. The device broadcasts control information indicating the portion, e.g., full channel or fractional channel portion(s), of the channel it occupies.

In one exemplary embodiment, there is a plurality of peer discovery channels in the recurring timing structure. A wireless communications device monitors at least a portion of the peer discovery channels and determines a level of congestion. In some embodiments, said communications device monitors the peer discovery channel it is using to transmit its peer discovery information from time to time and determines the congestion level based on the number of signals it decoded in that channel. In some embodiments, said communication device monitors each of the peer discovery channels and determines the congestion level based on the total occupancies of the channels. Based on its determined level of congestion, the wireless communications device determines whether to use a full peer discovery channel for its intended peer discovery transmissions or a fraction of a peer discovery channel for its intended peer discovery transmissions. The device broadcasts control information indicating which peer discovery channel portions it is using for transmission. To further reduce the number of collisions, i.e., two devices happen to choose overlapping fractions of the same peer discovery channel, a wireless communications device, in some embodiments, can determine which fractional portion it can use based on the control information received from other devices sharing the same peer discovery channel. For example, in some embodiments, a device may choose to use each of the even slots of a recurring peer discovery channel if it finds out that there is another device transmitting in the same peer discovery channel using each of the odd slots. In some embodiments, the control information is encoded via pilot signals, e.g., different pilot symbol sequences communicate different levels of channel usage and/or communicate which particular portions of a channel are being used by a device. In some embodiments, the control information is more robust as compared to the peer discovery information and the control information is decodable in some collision scenarios when peer discovery information is not decodable. The wireless communications device may, and sometimes does, change its amount and/or the fraction of peer discovery channel usage in response to a detected change in the level of congestion and/or in response to detected fraction usage information from devices sharing the same peer discovery channel. Dynamic adjustment of peer discovery resource usage in response to congestion variation can facilitate efficient use of the limited peer discovery air link resources since it can reduce the number of collisions in the peer discovery channels and thus improve the overall system performance. In some embodiments, wireless communications devices are wireless terminals. The wireless terminals may be, e.g., mobile devices, e.g., handheld devices such as phone devices, personal data assistants (PDAs), etc. Wireless terminal may be access terminals.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal comprising:
monitoring, at the wireless terminal, a recurring set of time and frequency resource units to determine a level of congestion in a communications system; and
determining, at the wireless terminal, a portion of a communications channel to be used by said wireless terminal for transmission purposes based on the determined level of congestion, said communications channel being one of a plurality of communications channels in said communications system;
wherein said portion of the communications channel is a fraction of the communications channel, the method further comprising:

broadcasting, from the wireless terminal, control information indicating the fraction of the communications channel which is being occupied by said wireless terminal, said fraction corresponding to the determined portion of the communications channel to be used by said wireless terminal;

wherein monitoring at the wireless terminal, a recurring set of time and frequency resource units to determine a level of congestion includes:

monitoring time and frequency resource units corresponding to a peer discovery communications channel, said peer discovery channel being one of said plurality of communications channels.

2. The method of claim 1, wherein said control information indicates which one of a plurality of recurring channel portions in a recurring channel timing structure said wireless terminal is using.

3. The method of claim 1, wherein said monitoring, at the wireless terminal, a recurring set of time and frequency resource units includes:

monitoring said communications channel on a periodic basis; and decoding broadcast control information from a second wireless communications device; and wherein said determining a portion of a communications channel to be used includes:

determining said portion of said communications channel to be used based on said broadcast control information from said second communications device.

4. The method of claim 1, further comprising: transmitting discovery information at time intervals which are determined based on the portion of the communications channel determined to be used by said wireless terminal.

5. The method of claim 1, wherein said level of network congestion is a function of a number of devices detected to be using said communications channel.

6. The method of 1, further comprising:

repeating said monitoring, determining and broadcasting steps, said wireless terminal changing the size of said portion of the communications channel used by said wireless terminal in response to a change in the determined level of congestion.

7. The method of claim 6, wherein said monitored recurring set of time and frequency resource units correspond to a plurality of different communications channels in said plurality of communications channels, said communications channel which corresponds to said portion used by said wireless terminal being one of said plurality of different communications channels.

8. The method of claim 6, wherein said change in the determined level of congestion is due to a change in utilization of communications resources in said monitored recurring set of time and frequency resource units by other devices than said wireless terminal.

9. The method of claim 8, wherein said change in the determined level of congestion is due, at least in part, to a change in utilization of communications resources corresponding to at least one channel other than said communications channel which corresponds to said portion used by said wireless terminal.

10. The method of claim 1, wherein said portion of the communications channel includes a number of fractional portions of said peer discovery communications channel, the number of fractional portions being a function of said determined level of congestion.

11. A wireless terminal comprising:

means for monitoring a recurring set of time and frequency resource units to determine a level of congestion in a communications system, said means for monitoring being implemented in hardware; and means for determining a portion of a communications channel to be used by said wireless terminal for transmission purposes based on the determined level of congestion, said communications channel being one of a plurality of communications channels in said communications system, said means for determining being implemented in hardware;

wherein said portion of the communications channel is a fraction of the communications channel, the wireless terminal further comprising:

means for broadcasting control information indicating the fraction of the communications channel which is being occupied by said wireless terminal, said fraction corresponding to the determined portion of the communications channel to be used by said wireless terminal, said means for broadcasting being implemented in hardware;

wherein said communications channel is a peer discovery channel used to communicate discovery information.

12. The wireless terminal communications device of claim 11, wherein said means for monitoring a recurring set of time and frequency resource units includes:

means for monitoring said communications channel on a periodic basis; and means for decoding broadcast control information from a second wireless communications device; and wherein said means for determining a portion of a communications channel to be used includes:

means for determining said portion of said communications channel to be used based on said broadcast control information from said second communications device.

13. The wireless terminal communications device of claim 11, further comprising:

means for transmitting discovery information at time intervals which are determined based on the portion of the communications channel determined to be used by said wireless terminal, said means for transmitting being implemented in hardware.

14. The wireless terminal of claim 13, wherein said portion of the communications channel determined to be used by said wireless terminal is a function of a number of devices detected to be using said communications channel.

15. The wireless terminal communications device of claim 11, further comprising:

means for controlling said means for monitoring, means for determining and means for broadcasting to repeat operations, said means for controlling being implemented in hardware; and means for changing the size of said portion of the communications channel used by said wireless terminal in response to a change in the determined level of congestion, said means for changing being implemented in hardware.

16. A computer program product for use in a wireless terminal, the computer program product comprising:

a non-transitory computer readable medium comprising:

code for causing at least one computer to monitor a recurring set of time and frequency resource units to determine a level of congestion in a communications system; and code for causing said at least one computer to determine a portion of a communications channel to be used by said wireless terminal for transmission purposes based on the determined level of congestion, said communications channel being one of a plurality of communications channels in said communications system;

wherein said portion of the communications channel is a fraction of the communications channel, the method further comprising:

broadcasting, from the wireless terminal, control information indicating the fraction of the communications channel which is being occupied by said wireless terminal, said fraction corresponding to the determined portion of the communications channel to be used by said wireless terminal;

wherein monitoring at the wireless terminal, a recurring set of time and frequency resource units to determine a level of congestion includes:

monitoring time and frequency resource units corresponding to a peer discovery communications channel, said peer discovery channel being one of said plurality of communications channels.

17. A wireless terminal comprising:

at least one processor configured to:

monitor a recurring set of time and frequency resource units to determine a level of congestion in a communications system; and determine a portion of a communications channel to be used by said wireless terminal for transmission purposes based on the determined level of congestion, said communications channel being one of a plurality of communications channels in said communications system; and memory coupled to said at least one processor;

wherein said portion of the communications channel is a fraction of the communications channel, and wherein said at least one processor is further configured to broadcast control information indicating the fraction of the communications channel which is being occupied by said wireless terminal, said fraction corresponding to the determined portion of the communications channel to be used by said wireless terminal;

wherein said communications channel is a peer discovery channel used to communicate discovery information.

* * * * *